(12) United States Patent
Schlottmann et al.

(10) Patent No.: US 8,384,710 B2
(45) Date of Patent: Feb. 26, 2013

(54) DISPLAYING AND USING 3D GRAPHICS ON MULTIPLE DISPLAYS PROVIDED FOR GAMING ENVIRONMENTS

(75) Inventors: Greg A. Schlottmann, Sparks, NV (US); David A. Gipp, Reno, NV (US)

(73) Assignee: IGT, Reno, NV (US)

( * ) Notice: Subject to any disclaimer, the term of this patent is extended or adjusted under 35 U.S.C. 154(b) by 1372 days.

(21) Appl. No.: 11/759,825

(22) Filed: Jun. 7, 2007

(65) Prior Publication Data
US 2008/0303746 A1 Dec. 11, 2008

(51) Int. Cl.
G06T 15/00 (2011.01)
(52) U.S. Cl. .......... 345/419; 345/420; 345/473; 463/32
(58) Field of Classification Search .................. None
See application file for complete search history.

(56) References Cited

U.S. PATENT DOCUMENTS

| | | | |
|---|---|---|---|
| 4,332,389 A | 6/1982 | Loyd et al. | |
| 4,365,810 A | 12/1982 | Richardson | |
| 4,373,126 A | 2/1983 | Churchill et al. | |
| 4,455,025 A | 6/1984 | Itkis | |
| 4,572,509 A | 2/1986 | Sitrick | |
| 4,624,462 A | 11/1986 | Itkis | |
| 4,634,126 A | 1/1987 | Kimura | |
| 4,798,387 A | 1/1989 | Richardson | |
| 4,823,345 A | 4/1989 | Daniel et al. | |
| 4,848,771 A | 7/1989 | Richardson | |
| 4,856,787 A | 8/1989 | Itkis | |
| 4,885,703 A | 12/1989 | Deering | |
| 4,914,607 A | 4/1990 | Takanashi et al. | |
| 4,986,543 A | 1/1991 | Heller | |

(Continued)

FOREIGN PATENT DOCUMENTS

| | | |
|---|---|---|
| AU | 200179477 | 5/2002 |
| AU | 200210214 | 8/2002 |

(Continued)

OTHER PUBLICATIONS

Mogilev, D., Kiyokawa, K., Billinghurst, M., Pair, J., AR Pad: An interface for face-to-face AR collaboration, Apr. 2002, CHI 2002, Tools for Collaboration, pp. 654-655.*

(Continued)

Primary Examiner — Said Broome
(74) Attorney, Agent, or Firm — Weaver Austin Villeneuve & Sampson LLP

(57) ABSTRACT

3D images (or graphics) are effectively displayed across multiple displays provided in a gaming environment based on a 3D imaging (or graphics) model (or world). A game scene for a game played on a gaming machine is effectively displayed as a larger 3D scene across multiple displays configured for multiple gaming machines when a gaming criteria, event or condition is met (e.g., when a slot game generates a particular outcome on a gaming machine, a 3D scene is displayed on multiple gaming machines). 3D images (or objects) effectively displayed across multiple displays configured for multiple gaming machines can effect and/or complement the game being played on one or more of the gaming machines and/or used as an independent game. Animation (or movement) of one or more 3D objects can be used to trigger a gaming criteria, event or condition (e.g., start a bonus period for a game being played in a gaming machine). The gaming criteria, event or condition can be triggered solely based on the animation (or movement) of the 3D object(s) or in a combination with another condition.

39 Claims, 12 Drawing Sheets

U.S. PATENT DOCUMENTS

| | | |
|---|---|---|
| 5,007,649 A | 4/1991 | Richardson |
| 5,227,771 A | 7/1993 | Kerr et al. |
| 5,242,163 A | 9/1993 | Fulton |
| 5,255,352 A | 10/1993 | Faulk |
| 5,297,802 A | 3/1994 | Pocock et al. |
| 5,303,388 A | 4/1994 | Kreitman et al. |
| 5,339,390 A | 8/1994 | Robertson et al. |
| 5,342,047 A | 8/1994 | Heidel et al. |
| 5,351,970 A | 10/1994 | Fioretti |
| 5,393,057 A | 2/1995 | Marnell, II |
| 5,435,554 A | 7/1995 | Lipson |
| 5,455,904 A | 10/1995 | Bouchet et al. |
| 5,469,536 A | 11/1995 | Blank |
| 5,485,197 A | 1/1996 | Hoarty |
| 5,594,844 A | 1/1997 | Sakai et al. |
| 5,604,852 A | 2/1997 | Watters et al. |
| 5,608,850 A | 3/1997 | Robertson |
| 5,621,906 A | 4/1997 | O'Neill et al. |
| 5,639,088 A | 6/1997 | Schneider et al. |
| 5,643,086 A | 7/1997 | Alcorn et al. |
| 5,678,015 A | 10/1997 | Goh |
| 5,682,043 A | 10/1997 | Pei et al. |
| 5,689,628 A | 11/1997 | Robertson |
| 5,729,673 A | 3/1998 | Cooper et al. |
| 5,742,779 A | 4/1998 | Steele et al. |
| 5,745,109 A | 4/1998 | Nakano et al. |
| 5,755,621 A | 5/1998 | Marks et al. |
| 5,766,074 A | 6/1998 | Cannon et al. |
| 5,775,993 A | 7/1998 | Fentz et al. |
| 5,788,573 A | 8/1998 | Baerlocher et al. |
| 5,805,783 A | 9/1998 | Ellson et al. |
| 5,807,172 A | 9/1998 | Piechowiak |
| 5,816,918 A | 10/1998 | Kelly et al. |
| 5,833,540 A | 11/1998 | Miodunski et al. |
| 5,836,819 A | 11/1998 | Ugawa |
| 5,880,733 A | 3/1999 | Horvitz et al. |
| 5,903,271 A | 5/1999 | Bardon et al. |
| 5,912,671 A | 6/1999 | Oka |
| 5,934,672 A | 8/1999 | Sines et al. |
| 5,941,772 A | 8/1999 | Paige |
| 5,956,038 A | 9/1999 | Rekimoto |
| 5,967,895 A | 10/1999 | Kellen |
| 5,998,803 A | 12/1999 | Forrest et al. |
| 6,002,403 A | 12/1999 | Sugiyama et al. |
| 6,002,853 A | 12/1999 | de Hond |
| 6,005,579 A | 12/1999 | Sugiyama et al. |
| 6,009,458 A | 12/1999 | Hawkins et al. |
| 6,012,984 A | 1/2000 | Roseman |
| 6,014,142 A | 1/2000 | LaHood |
| 6,023,371 A | 2/2000 | Onitsuka et al. |
| 6,027,115 A | 2/2000 | Griswold et al. |
| 6,029,973 A | 2/2000 | Takemoto |
| 6,031,545 A | 2/2000 | Ellenby et al. |
| 6,033,307 A | 3/2000 | Vancura |
| 6,043,818 A | 3/2000 | Nakano et al. |
| 6,050,895 A | 4/2000 | Luciano et al. |
| 6,057,856 A | 5/2000 | Miyashita et al. |
| 6,062,978 A | 5/2000 | Martino et al. |
| 6,080,063 A | 6/2000 | Khosla |
| 6,089,976 A | 7/2000 | Schneider et al. |
| 6,093,100 A | 7/2000 | Singer et al. |
| 6,094,196 A | 7/2000 | Berry et al. |
| 6,104,815 A | 8/2000 | Alcorn et al. |
| 6,106,396 A | 8/2000 | Alcorn et al. |
| 6,131,909 A | 10/2000 | Chilese |
| 6,135,884 A | 10/2000 | Hedrick et al. |
| 6,149,156 A | 11/2000 | Feola |
| 6,149,522 A | 11/2000 | Alcorn et al. |
| 6,159,095 A | 12/2000 | Frohm et al. |
| 6,183,361 B1 | 2/2001 | Cummings et al. |
| 6,203,009 B1 | 3/2001 | Sines et al. |
| 6,203,428 B1 | 3/2001 | Giobbi et al. |
| 6,206,782 B1 | 3/2001 | Walker et al. |
| 6,220,593 B1 | 4/2001 | Pierce et al. |
| 6,234,901 B1 | 5/2001 | Nagoshi et al. |
| 6,254,483 B1 | 7/2001 | Acres |
| 6,267,669 B1 | 7/2001 | Luciano, Jr. et al. |
| 6,271,842 B1 | 8/2001 | Bardon et al. |
| 6,280,325 B1 | 8/2001 | Fisk |
| 6,287,201 B1 | 9/2001 | Hightower |
| 6,315,666 B1 | 11/2001 | Mastera et al. |
| 6,319,128 B1 | 11/2001 | Miyoshi et al. |
| 6,331,146 B1 | 12/2001 | Miyamoto et al. |
| 6,332,838 B1 | 12/2001 | Yamagami |
| 6,342,892 B1 | 1/2002 | Van Hook et al. |
| 6,346,956 B2 | 2/2002 | Matsuda |
| 6,347,999 B1 | 2/2002 | Yuan |
| 6,390,470 B1 | 5/2002 | Huang |
| 6,398,218 B1 | 6/2002 | Vancura |
| 6,409,602 B1 | 6/2002 | Wiltshire et al. |
| 6,409,604 B1 | 6/2002 | Matsuno |
| 6,413,162 B1 | 7/2002 | Baerlocher et al. |
| 6,431,982 B2 | 8/2002 | Kobayashi |
| 6,454,649 B1 | 9/2002 | Mattice et al. |
| 6,458,032 B1 | 10/2002 | Yamagami |
| 6,506,114 B1 | 1/2003 | Estes et al. |
| 6,508,709 B1 | 1/2003 | Karmarkar |
| 6,512,522 B1 | 1/2003 | Miller et al. |
| 6,515,688 B1 | 2/2003 | Berry et al. |
| 6,517,433 B2 | 2/2003 | Loose et al. |
| 6,524,185 B2 | 2/2003 | Lind |
| 6,533,273 B2 | 3/2003 | Cole et al. |
| 6,537,150 B1 | 3/2003 | Luciano et al. |
| 6,542,168 B2 | 4/2003 | Negishi et al. |
| 6,559,863 B1 | 5/2003 | Megiddo |
| 6,569,017 B2 | 5/2003 | Enzminger et al. |
| 6,570,587 B1 | 5/2003 | Efrat et al. |
| 6,577,330 B1 | 6/2003 | Tsuda et al. |
| 6,597,358 B2 | 7/2003 | Miller |
| 6,597,380 B1 | 7/2003 | Wang et al. |
| 6,626,760 B1 | 9/2003 | Miyamoto et al. |
| 6,628,310 B1 | 9/2003 | Hiura et al. |
| 6,641,478 B2 | 11/2003 | Sakai |
| 6,645,070 B2 | 11/2003 | Lupo |
| 6,656,040 B1 | 12/2003 | Brosnan et al. |
| 6,656,044 B1 | 12/2003 | Lewis |
| 6,661,426 B1 | 12/2003 | Jetha et al. |
| 6,667,741 B1 | 12/2003 | Kataoka et al. |
| 6,669,562 B1 | 12/2003 | Shiino |
| 6,700,588 B1 | 3/2004 | MacInnis et al. |
| 6,734,884 B1 | 5/2004 | Berry et al. |
| 6,746,329 B1 | 6/2004 | Duhamel |
| 6,760,050 B1 | 7/2004 | Nakagawa |
| 6,769,982 B1 | 8/2004 | Brosnan |
| 6,772,195 B1 | 8/2004 | Hatleid et al. |
| 6,802,776 B2 | 10/2004 | Lind et al. |
| 6,811,482 B2 | 11/2004 | Letovsky |
| 6,822,662 B1 | 11/2004 | Cook et al. |
| 6,840,858 B2 | 1/2005 | Adams |
| 6,847,162 B2 | 1/2005 | Duggal et al. |
| 6,866,585 B2 | 3/2005 | Muir |
| 6,887,157 B2 | 5/2005 | LeMay et al. |
| 6,902,481 B2 | 6/2005 | Breckner et al. |
| 6,922,815 B2 | 7/2005 | Rosen |
| 6,938,218 B1 | 8/2005 | Rosen |
| 6,942,571 B1 | 9/2005 | McAllister et al. |
| 7,008,324 B1 | 3/2006 | Johnson et al. |
| 7,009,611 B2 | 3/2006 | Di Lelle |
| 7,034,825 B2 | 4/2006 | Stowe et al. |
| 7,070,504 B2 | 7/2006 | Iwamoto |
| 7,179,166 B1 | 2/2007 | Abbott |
| 7,192,345 B2 | 3/2007 | Muir et al. |
| 7,291,068 B2 | 11/2007 | Bryant et al. |
| 7,318,774 B2 | 1/2008 | Bryant et al. |
| 7,367,885 B2 | 5/2008 | Escalera et al. |
| 7,400,322 B1 * | 7/2008 | Urbach .................. 345/419 |
| 7,465,230 B2 | 12/2008 | LeMay et al. |
| 7,503,003 B2 | 3/2009 | Kamen et al. |
| 7,503,006 B2 | 3/2009 | Danieli |
| 7,572,186 B2 | 8/2009 | LeMay et al. |
| 7,581,195 B2 | 8/2009 | Sciammarella et al. |
| 7,901,289 B2 | 3/2011 | Schlottmann et al. |
| 7,909,696 B2 | 3/2011 | Beaulieu et al. |
| 7,918,730 B2 | 4/2011 | Brosnan et al. |
| 7,934,994 B2 | 5/2011 | LeMay et al. |
| 8,002,623 B2 | 8/2011 | Resnick et al. |
| 8,012,019 B2 | 9/2011 | Escalera et al. |

| | | | |
|---|---|---|---|
| 8,267,767 B2 | 9/2012 | Kryuchkov et al. | |
| 2001/0054794 A1 | 12/2001 | Cole et al. | |
| 2002/0013170 A1 | 1/2002 | Miller | |
| 2002/0016201 A1 | 2/2002 | Bennett et al. | |
| 2002/0019253 A1 | 2/2002 | Reitzen et al. | |
| 2002/0105515 A1 | 8/2002 | Mochizuki | |
| 2002/0111208 A1 | 8/2002 | Marta | |
| 2002/0111212 A1 | 8/2002 | Muir | |
| 2002/0113369 A1 | 8/2002 | Weingardt | |
| 2002/0113820 A1 | 8/2002 | Robinson et al. | |
| 2002/0132661 A1 | 9/2002 | Lind | |
| 2002/0175466 A1 | 11/2002 | Loose et al. | |
| 2003/0013517 A1 | 1/2003 | Bennett et al. | |
| 2003/0032479 A1* | 2/2003 | LeMay et al. | 463/32 |
| 2003/0045345 A1 | 3/2003 | Berman | |
| 2003/0064781 A1 | 4/2003 | Muir | |
| 2003/0064801 A1 | 4/2003 | Breckner et al. | |
| 2003/0119581 A1 | 6/2003 | Cannon et al. | |
| 2003/0125101 A1 | 7/2003 | Campo | |
| 2004/0002380 A1 | 1/2004 | Brosnan | |
| 2004/0029636 A1* | 2/2004 | Wells | 463/32 |
| 2004/0048657 A1 | 3/2004 | Gauselmann | |
| 2004/0077402 A1 | 4/2004 | Schlottmann | |
| 2004/0077404 A1 | 4/2004 | Schlottmann et al. | |
| 2004/0092302 A1 | 5/2004 | Gauselmann | |
| 2004/0102244 A1 | 5/2004 | Kryuchkov et al. | |
| 2004/0102245 A1 | 5/2004 | Escalera et al. | |
| 2004/0198485 A1 | 10/2004 | Loose et al. | |
| 2004/0266515 A1 | 12/2004 | Gauselmann | |
| 2005/0001845 A1* | 1/2005 | Noyle | 345/522 |
| 2005/0075167 A1 | 4/2005 | Beaulieu et al. | |
| 2005/0225559 A1 | 10/2005 | Robertson et al. | |
| 2005/0233798 A1 | 10/2005 | Van Asdale | |
| 2005/0233799 A1 | 10/2005 | LeMay et al. | |
| 2006/0025199 A1 | 2/2006 | Harkins et al. | |
| 2006/0229122 A1 | 10/2006 | Macke | |
| 2006/0287058 A1 | 12/2006 | Resnick et al. | |
| 2007/0155471 A1 | 7/2007 | Powell et al. | |
| 2007/0155472 A1 | 7/2007 | Gail et al. | |
| 2007/0155473 A1 | 7/2007 | Powell et al. | |
| 2007/0161423 A1 | 7/2007 | Bienvenue et al. | |
| 2007/0293292 A1 | 12/2007 | Gipp et al. | |
| 2008/0045331 A1 | 2/2008 | LeMay et al. | |
| 2008/0076546 A1 | 3/2008 | Moyle et al. | |
| 2008/0188303 A1 | 8/2008 | Schlottmann et al. | |
| 2008/0188304 A1 | 8/2008 | Escalera et al. | |
| 2009/0062001 A1 | 3/2009 | LeMay et al. | |
| 2011/0165929 A1 | 7/2011 | Brosnan et al. | |
| 2011/0165930 A1 | 7/2011 | Brosnan et al. | |
| 2011/0165931 A1 | 7/2011 | Brosnan et al. | |

FOREIGN PATENT DOCUMENTS

| | | |
|---|---|---|
| AU | 200227720 | 2/2003 |
| AU | 2003237479 | 1/2004 |
| AU | 2006203556 | 9/2006 |
| CA | 2 343 870 | 10/2001 |
| EP | 0 475 581 | 3/1992 |
| EP | 0 759 315 | 2/1997 |
| EP | 0 830 881 | 3/1998 |
| GB | 2 405 107 | 2/2005 |
| GB | 2 412 282 | 9/2005 |
| GB | 2 420 294 | 5/2006 |
| GB | 2 459 628 | 11/2009 |
| GR | 62140 B | 8/1979 |
| JP | 07-044735 | 2/1995 |
| JP | 2001-070634 | 3/2001 |
| JP | 2002-099926 (A) | 4/2002 |
| RU | 2 067 775 C1 | 10/1996 |
| RU | 2 168 192 C2 | 5/2001 |
| WO | 98/45004 | 10/1998 |
| WO | WO 02/32521 | 4/2002 |
| WO | WO 02/073501 | 9/2002 |
| WO | WO 2004/002591 | 1/2004 |
| WO | WO2004/028650 | 4/2004 |
| WO | WO 2004/029893 | 4/2004 |
| WO | WO 2005/016473 | 2/2005 |
| WO | WO 2005/034054 | 4/2005 |
| WO | WO 2006/039324 | 4/2006 |
| WO | WO 2008/005278 | 1/2008 |
| WO | WO 2008/154433 | 12/2008 |

OTHER PUBLICATIONS

International Search Report and Written Opinion dated Oct. 24, 2008 from corresponding PCT Application No. PCT/US2008/066196.

Microsoft Press Computer Dictionary Third Edition Redmond, WA 1997 p. 406.

Carson G. S.: "Standards Pipeline. The OpenGL Specification" Computer Graphics, ACM, US, vol. 31, No. 2, May 1997, pp. 17-18, XP000969297, ISSN: 097-8930.

Mason Woo, Jackie Neider, Tom Davis, Dave Shreiner, OpenGL Program Guide: The Official Guide to Learning OpenGL, Introduction to OpenGL Chapter 1, Version 1.2, 3.sup.rd edition, Open GL Architecture Review Board, Addison-Wesley Publishing, Co., 1999, ISBN: 0201604582.

Power VR (PowerVR), 3D Graphicai Processing, Nov. 14, 2000, Copyright Power VR 2000.

M2 Presswire, Aristocrat Technologies to use PowerVR Technology in Casino Video Machines, Australian Company Leads Market for Video Machine Games of Chance, Oct. 17, 2000, http//www.aristocrat.com.au/PR181000.htm, Copyright 2000 M2 Communications Ltd.

David Einstein, 3D Web Browsing on the Horizon, Nov. 27, 2000, http://www.forbes.com/2001/11/27/1127thread.html, Forbes.com.

Supplemental Information Disclosure Statement dated Jan. 28, 2004 from related U.S. Appl. No. 10/272,788 4 pages.

"3D Modelers Are Running under Linux" LinusFocus: vol. Nr 4, May 1998 http://mercury.chem.pitt.edu/~tiho/LinuxFocus/English/May 1998/index.html printed on Oct. 11, 2002.

Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.

"Learn How to Program 3D Graphics" LinuxFocus vol. NR 2, Jan. 1998, 1-2 pages http://mercury.chem.pitt.edu/~tiho/LinuxFocus/English/January1998/index/html.

Miguel Angel Sepulveda, "Open GL Programming: The 3D Scene" pp. 1-7 http://mercury.chem.pitt.edu/~tiho/LinuxFocus/English/May1998/article46.html.

Miguel Angel Sepulveda. "What is OpenGL?" LinuxFocus vol. 2 pp. 1-5 http://mercury.chem.pitt.edu/~tiho/LinuxFocus/English/January1998/articie15.html printed on Oct. 11, 2002.

"TE 5 Graphics Accelerator Technology Preview" NEC Aug. 2001, 7 pages.

"A Primer from Mercury Research the Basics of 3D Graphics Technology" The Meter available at http://www.themeter.com/artilces/3DBasics.shtml printed on Jan. 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: Balancing the Pipeline", The Meter, available at http://www.themeter.com/articles/3DBasics-3.shtml, printed on Jan. 31, 2003 pp. 1-2.

"The Basics of 3D: Adding Parallelism", The Meter, available at http://www.themeter.com/articles/3DBasics-4.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

"The Basics of 3D: Transform and Lighting", The Meter, available at http://www.themeter.com/articles/3DBasics-6.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

Scott et al. "An Overview of VISUALIZE fx Graphics Accelerator Hardware" Article 4 Hewlet Packard Company May 1998 HP Journal.

"Pattern Display Device," Patent Abstracts of Japan, Publication No. 2002-085624, published Mar. 26, 2002.

"Game Machine," Patent Abstracts of Japan, Publication No. 2001-252394, published Sep. 18, 2001.

"Game Machine," Patent Abstracts of Japan, Publication No. 2001-252393, published Sep. 18, 2001.

"Slot Machine," Patent Abstracts of Japan, Publication No. 2001-062032, published Mar. 13, 2001.

Segal et al., "The OpenGL Graphics System: A Specification (Version 1.3)", 2001, printed from http://www.opengl.org/documentation/specs/version1.3/gispec13.pdf, pp. 1-11, 66-73 and 181-189 (29 pages).

Rose, "Nevada A.G. Finds Free Internet Gambling is Still Gambling". Mar. 2001, printed http://rose.casinocitytimes.com/articles/974.html, pp. 1-4.

Segal et al., "The OpenGL Graphics System: A Specification (Version 1.3)", 2001, printed from http//www.opengl.org/documentation/specs/version1.3/glspec13.pdf, pp. 1-11, 66-73 and 181-189 (40 pages).

U.S. Appl. No. 13/555,811, filed Jul. 23, 2012, Kryuchkov et al.

U.S. Appl. No. 13/618,456, filed Sep. 14, 2012, Kryuchkov et al.

U.S. Office Action dated Jun. 13, 2003 issued in U.S. Appl. No. 09/927,901.

U.S. Office Action dated Dec. 22, 2003 issued in U.S. Appl. No. 09/927,901.

U.S. Office Action date Jun. 21, 2004 issued in U.S. Appl. No. 09/927,901.

U.S. Notice of Allowance dated Dec. 16, 2004 issued in U.S. Appl. No. 09/927,901.

U.S. Office Action dated Dec. 10, 2007 issued in U.S. Appl. No. 11/112,076.

U.S. Notice of Allowance dated Sep. 15, 2008 issued in U.S. Appl. No. 11/112,076.

U.S. Office Action dated Dec. 12, 2007 issued in U.S. Appl. No. 11/829,807.

U.S. Notice of Allowance dated Sep. 8, 2008 issued in U.S. Appl. No. 11/829,807.

U.S. Office Action dated Mar. 15, 2010 issued in U.S. Appl. No. 12/264,877.

U.S. Notice of Allowance dated Aug 16, 2010 issued in U.S. Appl. No. 12/264,877.

U.S. Notice of Allowance dated Nov. 1, 2010 issued in U.S. Appl. No. 12/264,877.

U.S. Office Action dated Aug 18, 2010 issued in U.S. Appl. No. 11/481,666.

U.S. Office Action ( Ex Parte Quayle) dated Feb. 9, 2011 issued in U.S. Appl. No. 11/481,666.

U.S. Notice of Allowance dated Jun. 13, 2011 issued in U.S. Appl. No. 11/481,666.

U.S. Office Action dated Jun. 17, 2005 issued in U.S. Appl. No. 10/187,343.

U.S. Final Office Action dated Jan. 30, 2007 issued in U.S. Appl. No. 10/187,343.

U.S. Office Action dated Jun. 27, 2007 issued in U.S. Appl. No. 10/187,343.

U.S. Office Action dated Aug. 21, 2008 issued in U.S. Appl. No. 10/187,343.

U.S. Office Action dated May 15, 2009 issued in U.S. Appl. No. 10/187,343.

U.S. Final Office Action dated May 10, 2010 issued in U.S. Appl. No. 10/187,343.

U.S. Notice of Allowance dated Aug. 6, 2010 issued in U.S. Appl. No. 10/187,343.

U.S. Notice of Allowance dated Nov. 30, 2010 issued in U.S. Appl. No. 10/187,343.

U.S. Office Action (IDS considered) dated Feb. 14, 2011 issued in U.S. Appl. No. 10/187,343.

U.S. Office Action dated Jul. 11, 2012 issued in U.S. Appl. No. 13/047,717.

U.S. Office Action dated Jun. 6, 2012 issued in U.S. Appl. No. 13/047,720.

Third Party Submission for U.S. Appl. No. 13/047,721 dated Sep. 7, 2011.

U.S. Office Action dated Jun. 5, 2012 issued in U.S. Appl. No. 13/047,721.

U.S. Notice of Allowance dated Oct. 2, 2012 issued in U.S. Appl. No. 13/047,721.

U.S. Office Action dated Sep. 6, 2007 issued in U.S. Appl. No. 10/803,233.

U.S. Office Action dated Jun. 24, 2008 issued in U.S. Appl. No. 10/803,233.

U.S. Office Action dated Jan. 23, 2009 issued in U.S. Appl. No. 10/8803,233.

U.S. Final Office Action dated Oct. 1, 2009 issued in U.S. Appl. No. 10/803,233.

U.S. Notice of Allowance dated Jan. 27, 2010 issued in U.S. Appl. No. 10/803,233.

U.S. Notice of Allowance dated Mar. 11, 2010 issued in U.S. Appl. No. 10/803,233.

U.S. Notice of Allowance dated Jul. 12, 2010 issued in U.S. Appl. No. 10/803,233.

U.S. Notice of Allowance and Examiners Communication dated Nov. 3, 2010 issued in U.S. Appl. No. 10/803,233.

U.S. Office Action ( IDS considered) dated Feb. 10, 2011 issued in U.S. Appl. No. 10/803,233.

U.S. Office Action dated Jun. 12, 2007 issued in U.S. Appl. No. 10/674,884.

U.S. Final Office Action dated Feb. 20, 2008 issued in U.S. Appl. No. 10/674,884.

U.S. Notice of Panel Decision from Pre-Appeal Brief Review dated Aug. 14, 2008 issued in U.S. Appl. No. 10/674,884.

U.S. Notification of Non-Compliant Appeal Brief dated Mar. 10, 2009 issued in U.S. Appl. No. 10/674,884.

U.S. Action—Examiner's Answer re Brief on Appeal, dated Jun. 22, 2009 issued in U.S. Appl. No. 10/674,884.

U.S. Action—Examiner's Communication re IDS Considered dated Jul. 27, 2009 issued in U.S. Appl. No. 10/674,884.

U.S. Action—Before the Board of Patent Appeals and Interferences, Decision on Appeal dated Jan. 11, 2012 issued in U.S. Appl. No. 10/674,884.

U.S. Notice of Allowance dated Feb. 6, 2012 issued in U.S. Appl. No. 10/674,884.

U.S. Notice of Allowance dated May 11, 2012 issued in U.S. Appl. No. 10/674,884.

U.S. Office Action dated Dec. 22, 2008 issued in U.S. Appl. No. 12/101,921.

U.S. Office Action dated Feb. 12, 2007 issued in U.S. Appl. No. 10/676,719.

U.S. Notice of Allowance dated Sep. 24, 2007 issued in U.S. Appl. No. 10/676,719.

U.S. Notice of Allowance dated Dec. 21, 2007 issued in U.S. Appl. No. 10/676,719.

U.S. Office Action dated May 18, 2010 issued in U.S. Appl. No. 12/101,921.

U.S. Office Action Final dated Oct. 29, 2010 issued in U.S. Appl. No. 12/101,921.

U.S. Office Action dated Feb. 15, 2011 issued in U.S. Appl. No. 12/101,921.

U.S. Notice of Allowance dated Jun. 24, 2011 issued in U.S. Appl. No. 12/101,921.

U.S. Office Action dated Feb. 8, 2005 issued in U.S. Appl. No. 10/272,788.

U.S. Office Action dated May 25, 2005 issued in U.S. Appl. No. 10/272,788.

U.S. Office Action dated Jun. 1, 2006 issued in U.S. Appl. No. 10/272,788.

U.S. Office Action dated Oct. 26, 2006 issued in U.S. Appl. No. 10/272,788.

U.S. Office Action dated Feb. 22, 2007 issued in U.S. Appl. No. 10/272,788.

U.S. Office Action ( Notice of Panel Decision on Pre-Appeal Brief Review) dated Aug. 2, 2007 issued in U.S. Appl. No. 10/272,788.

U.S. Office Action dated Nov. 5, 2008 issued in U.S. Appl. No. 12/024,931.

U.S. Final Office Action dated Jun. 9, 2009 issued in U.S. Appl. No. 12/024,931.

U.S. Office Action dated Dec. 31, 2009 issued in U.S. Appl. No. 12/024,931.

U.S. Notice of Non-Compliant Amendment (37 CFR 1.121) dated Aug. 11, 2010 issued in U.S. Appl. No. 12/024,931.
U.S. Notice of Allowance dated Sep. 20, 2010 issued in U.S. Appl. No. 12/024,931.
U.S. Notice of Allowance dated Nov. 15, 2010 issued in U.S. Appl. No. 12/024,931.
Australian Examiner's first report dated Nov. 21, 2005 issued in AU 27720/02.
Australian Examiner's First report dated Jun. 26, 2008 issued in AU 2006203556.
PCT International Search Report and Written Opinion dated Feb. 12, 2008 issued in PCT/US2007/015015.
PCT International Preliminary Report on Patentability and Written Opinion dated Jan. 6, 2009 issued in PCT/US2007/015015.
EP Examination Report dated Jun. 3, 2009 issued in EP 07 809 991.8-2221.
EP Result of Consultation dated Sep. 1, 2009 issued in EP 07 809 991.8-2221.
PCT International Search Report dated Jan. 13, 2004 issued in PCT/US2003/018028.
Australian Examiner's first report dated Jun. 18, 2008 issued in AU 2003237479.
British Examination Report dated Jun. 9, 2005 issued in UK 0427512.9.
British Examination Report dated Nov. 7, 2006, issued in GB 0427512.9.
UK Combined Search and Examination Report under Sections 17 and 18(3) dated Mar. 15, 2006 issued in GB0600005.3.
Autralian Examiner's first report dated Mar. 12, 2010 issued in AU 2005201148.
Australian Examiner's Report No. 2 dated Aug. 10, 2010 issued in AU 2005201148.
UK Search Report under Section 17(5) dated Jun. 22, 2005 issued in GB 0505328.5.
British Examination Report dated May 14, 2009 issued in GB 0505328.5
British Examination Report dated Dec. 9, 2009 issued in GB 0505328.5
PCT International Search Report dated Mar. 1, 2004 issued in PCT/US2003/031138.
Australian Examiner's first report dated Feb. 16, 2009 issued in AU 2003279092.
European Office Action dated Nov. 24, 2005 issued in EP 03 770 604.1—1238.
Russian Advisory Office Action dated Jul. 19, 2007 issued in RU 2005109160/09 (010839).
PCT International Search Report dated Mar. 19, 2004 issued in PCT/US2003/031158.
Australian Examiner's first report dated Feb. 6, 2009 issued in AU 2003279742.
European Examination Report dated Dec. 15, 2005 issued in EP 03 773 084.3—2218.
European Office Action dated Jun. 29, 2007 issued in EP 03 773 084.3—2218.
Russian Advisory Action dated Jul. 19, 2007 issued in RU 2005109161/09 (010840).
PCT International Search Report and Written Opinion dated Oct. 24, 2008 issued in PCT/US2008/066196.
PCT International Preliminary Report on Patentability and Written Opinion dated Dec. 7, 2009 issued in PCT/US2008/066196.
Australian Examiner's First Report dated Apr. 23, 2012 issued in AU 2008261879.
GB Examination Report dated Nov. 28, 2011 issued in GB0915991.4.
GB Examination Report dated Sep. 14, 2012 issued in GB0915991.4.
Brice, Richard, Reference book on digital TV, Town of Zhukovsky, Era, 2001. p. 148/4/ Dec. 2001.
England and Wales High Court (Patent Court) Decisions; Neutral Citation No.: [2005]EWHC 2416 (Pat) Case No. CH/2005/APP/0232 http://www.baliii.org/we/cases/EWHC/Patents/2005/2416.html (5 pgs.), Jun. 2005.
GameSpot Staff, "15 Most Influential Games of All Time" Gamespot [online], retrieved May 30, 2007, Retrieved from the Internet <http://web.archive.org/web/20010618175937/http://gamespot.com/gamespot/features/pc/most_influential/p16.html>May 2007.
Patents Act 1977: Examining for Patentability Article http://www.patent.gov.uk/patent/notices/practice/examforpat.htm (3 pgs.) Jul. 1977.
"PowerVR Technologies Debuts KYRO II SE Graphics Processor at CeBIT 2002", Tech/Zone, Mar. 13, 2002, avaliable at http://www.techzone.pcvsconsole.com/news.php?tzd=1246, 3 pages.
Scarne, John., Scarne of Cards, 1949, Crown Publishers, p.243 Jul. 1949.

* cited by examiner

DISPLAYING AND USING 3D GRAPHICS ON MULTIPLE DISPLAYS PROVIDED FOR GAMING ENVIRONMENTS

BACKGROUND OF THE INVENTION

Three-dimensional (3D) computer imgaging (or graphics) is a relatively new technical area. Despite many challenges, this (3D) computer imgaging (or graphics) has become increasingly more popular. As known in the art, 3D images or graphics can be generated with the aid of a digital computer (or computer) and specialized 3D software. Generally speaking, 3D computer imgaging (or graphics) may also refer to the process of creating graphics, or the field of study of 3D computer graphic techniques and its related technology. 3D computer graphics are different from two-dimensional (2D) computer graphics in that a three-dimensional (3D) representation of geometric data is typically stored in the computer for the purposes of performing calculations and displaying (or rendering) 2D images. However, 3D computer graphics may rely on many of the same algorithms used by 2D computer graphics. In general, the art of 3D modeling, which prepares geometric data for 3D computer graphics is akin to sculpting, while the art of 2D graphics is more analogous to painting. However, those skilled in the art will readily appreciate that 3D computer graphics may rely on many of the same algorithms used by 2D computer graphics In computer graphics software, this distinction is occasionally blurred; some 2D applications use 3D techniques to achieve certain effects such as lighting, while some primarily 3D applications make use of 2D visual techniques. 2D graphics can be considered to be a subset of 3D graphics.

OpenGL (Open Graphics Library) and Direct3D are among popular Application Program Interfaces (API's) for the generation of real-time imagery. In this context, Real-time generally means that image generation occurs in "real time", or "on the fly." Many modern graphics cards provide some degree of hardware "acceleration" based on these APIs, frequently enabling the display of complex 3D graphics in real-time. However, it is not necessary to use a graphics card to actually create 3D imagery.

For simplification, the process of creating 3D computer graphics can be sequentially divided into three basic phases: a modeling phase, a scene layout setup phase, and a rendering phase.

The modeling phase or (stage) can be described as shaping individual objects that are later used in a 3D scene. A number of modeling techniques are known to those skilled in the art (e.g., constructive solid geometry, NURBS modeling, polygonal modeling, subdivision surfaces, implicit surfaces). It should be be noted that a modeling process can also include editing object surface or material properties (e.g., color, luminosity, diffuse and specular shading components—more commonly called roughness and shininess, reflection characteristics, transparency or opacity, or index of refraction), adding textures, bump-maps and other features. 3D Modeling can also include various activities related to preparing a 3D model for animation. However, in a complex character model, this will become a stage of its own, known as rigging.

3D Objects can be fitted with a skeleton, a central framework of an object with the capability of affecting the shape or movements of that object. This aids in the process of animation, in that the movement of the skeleton will automatically affect the corresponding portions of a 3D model. At the rigging stage, the model can also be given specific controls to make animation easier and more intuitive, such as facial expression controls and mouth shapes (phonemes) for lipsyncing. 3D Modeling can be performed by means of a dedicated program (e.g., Lightwave Modeler, Rhinoceros 3D, Moray), an application component (Shaper, Lofter in 3D Studio) or some scene description language (as in POV-Ray). In some cases, there is no strict distinction between phases. As such, modelling can be just a part of a scene creation process (e.g., Caligari trueSpace). TrueSpace is a 3D computer graphics and animation software developed by Caligari Corporation, originally created for the Amiga Computer, and later for the Windows platform. One of the most distinctive features of trueSpace is its interface, using mainly 3D widgets for most common editing operations. The software can be used for modelling, animating and rendering (using the Lightworks rendering engine), and basic post-processing.

As a second basic phase of 3D computer graphics processing, scene setup can involve arranging virtual objects, lights, cameras and other entities on a 3D scene (or scene) which will is later used to produce a still image or an animation. If used for animation, this phase usually makes use of a technique called "keyframing", which facilitates creation of complicated movement in the scene. With the aid of keyframing, instead of having to fix an object's position, rotation, or scaling for each frame in an animation, one needs only to set up some key frames between which states in every frame are interpolated. Lighting can be an important aspect of scene setup.

As is the case in real-world scene arrangement, lighting can be a significant contributing factor to the resulting aesthetic and visual quality of the finished work. The process of transforming representations of objects, such as the middle point coordinate of a sphere and a point on its circumference into a polygon representation of a sphere, is called tessellation. This step is used in polygon-based rendering, where objects are broken down from abstract representations ("primitives") such as spheres, cones etc, to so-called meshes, which can be nets of interconnected triangles. Meshes of triangles (instead of e.g. squares) are popular as they have proven to be easy to render using scanline rendering. Polygon representations are not used in all rendering techniques, and in these cases the tessellation step is not included in the transition from abstract representation to rendered scene.

Rendering can be considered to be the final phase of creating the actual 2D image or animation from a prepared 3D scene. This phase is comparable to taking a photo or filming the scene after the setup is finished in real life. Rendering for interactive media, such as games and simulations, is calculated and displayed in real time, at rates of approximately 20 to 120 frames per second.

Animations for non-interactive media, such as video and film, are rendered much more slowly. Non-real time rendering enables the leveraging of limited processing power in order to obtain higher image quality. Rendering times for individual frames may vary from a few seconds to an hour or more for complex scenes. Rendered frames are stored on a hard disk, then possibly transferred to other media such as motion picture film or optical disk. These frames are then displayed sequentially at high frame rates, typically 24, 25, or 30 frames per second, to achieve the illusion of movement. This can be done by using Ray tracing and GPU (Graphics Processing Unit) based real-time polygonal rendering. The goals are different. A ray-traced image can take seconds or minutes to render as photo-realism is the goal. This is the basic method employed in films, digital media, artistic works, etc. In contrast, In real time rendering, the goal is often to show as much information as possible as the eye can process in a 30th of a second. The goal here is primarily speed and not photo-realism. As such, here exploitations can be made in the way the eye 'perceives' the world. Thus, the final image presented is not necessarily that of the real-world, but one which the eye can closely associate to the world. This is the basic method employed in games, interactive worlds. A Graphics Processing Unit or GPU (also occasionally called Visual Processing Unit or VPU) is a dedicated graphics rendering device for a personal computer or game console. Modern GPUs are very efficient at manipulating and displaying computer graphics, and their highly-parallel structure makes them more effective than typical CPUs for a range of complex 3D related algorithms.

SUMMARY OF THE INVENTION

Broadly speaking, the invention relates to 3D imaging (or graphics) for computing environments (e.g., gaming environments).

In accordance with one aspect of the invention, 3D images (or graphics) are effectively displayed across multiple displays provided in a gaming environment. It will be appreciated that 3D data can be generated based on a 3D imaging (or graphics) model (or world). More particularly, 3D data can be effectively used to display (or render) multiple 3D images on multiple displays effectively provided or configured for one or more gaming machines in a gaming environment. As such, multiple displays configured for a number of gaming machines can, for example, display various views, parts and/or portions of a 3D scene when the gaming machines are operational for playing one or more games in the gaming environment. The displays can be configured to effectively provide a virtual canvas spanning an area much larger than the size of any single one of the displays. By way of example, the virtual canvas can be provided by several displays configured for several gaming machines in a configuration spanning a relatively large physical area (e.g., a row of gaming machines or an entire floor of a casino). In general, various 3D images (or graphics) can be displayed based on a 3D model (or world) on the virtual canvas effectively provided by the configuration of the displays. In one embodiment, a large 3D scene (or 3D world) can be effectively depicted across the virtual canvas. A human observer can visually connect the individual views, parts and/or portions of a 3D scene displayed on individual displays to effectively observe a more complete scene or a virtual world (e.g., an ocean floor, fish tank, football game). It will be appreciated that the scenes or virtual world can, for example, be presented as a part of a game or used in connection with a game, serve as background for attracting player, or utilized for other applications that may not be directly or even remotely connected to the gaming operations (advertising, news).

In accordance with another aspect of the invention, multiple 3D scenes are effectively displayed across multiple displays as a result of a gaming criteria, event or condition (e.g., a bonus condition causing display of a 3D scene has been met). In one embodiment, a game scene for a game played on an individual gaming machine is effectively displayed as a larger 3D scene across multiple displays configured for multiple gaming machines when a gaming criteria, event or condition is met (e.g., when a slot game played on a single machine generates a particular outcome. The slot game is effectively displayed on multiple machines).

In accordance with yet another aspect of the invention, 3D images (or 3D objects) effectively displayed across multiple displays configured for multiple gaming machines can at least affect and/or complement the game being played on one or more of the gaming machines. The 3D images (or objects) displayed can also be part of an independent game which can, for example, be played at the same time and/or in connection with a game played on an individual gaming machine. In one embodiment, 3D objects are animated in a 3D scene that spans a plurality of displays respectively configured for a plurality of gaming machines. It will be appreciated that animation (or movement) of one or more 3D objects can, for example, be used to trigger a gaming criteria, event or condition (e.g., movement of a 3D object can trigger and/or indicate the start of a bonus period for a game being played in a gaming machine). The gaming criteria, event or condition can be triggered solely based on the animation (or movement) of the 3D object(s) or in a combination with another condition. This other condition can, for example, be a random event (e.g., picking a gaming machine at random), a timing condition (e.g., a timer expiring) and/or a gaming condition (e.g., a gaming machine playing and/or generating a particular outcome for a game played on a gaming machine when movement or animation of a 3D object results in a 3D object being displayed on a display configured for the gaming machine). By way of example, animation of a fish the appears to be swimming across a 3D virtual world can be used to trigger a bonus period for a gaming machine that happens to displays the fish on its display if a winning outcome is generated on the gaming machine before the fish "disappears" (e.g., swims to another display).

The invention can be implemented in numerous ways, including a method, an apparatus, a computer readable medium, a computing device, or a signal embodied in a carrier wave (e.g., a signal transmitted from a server to client machine). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
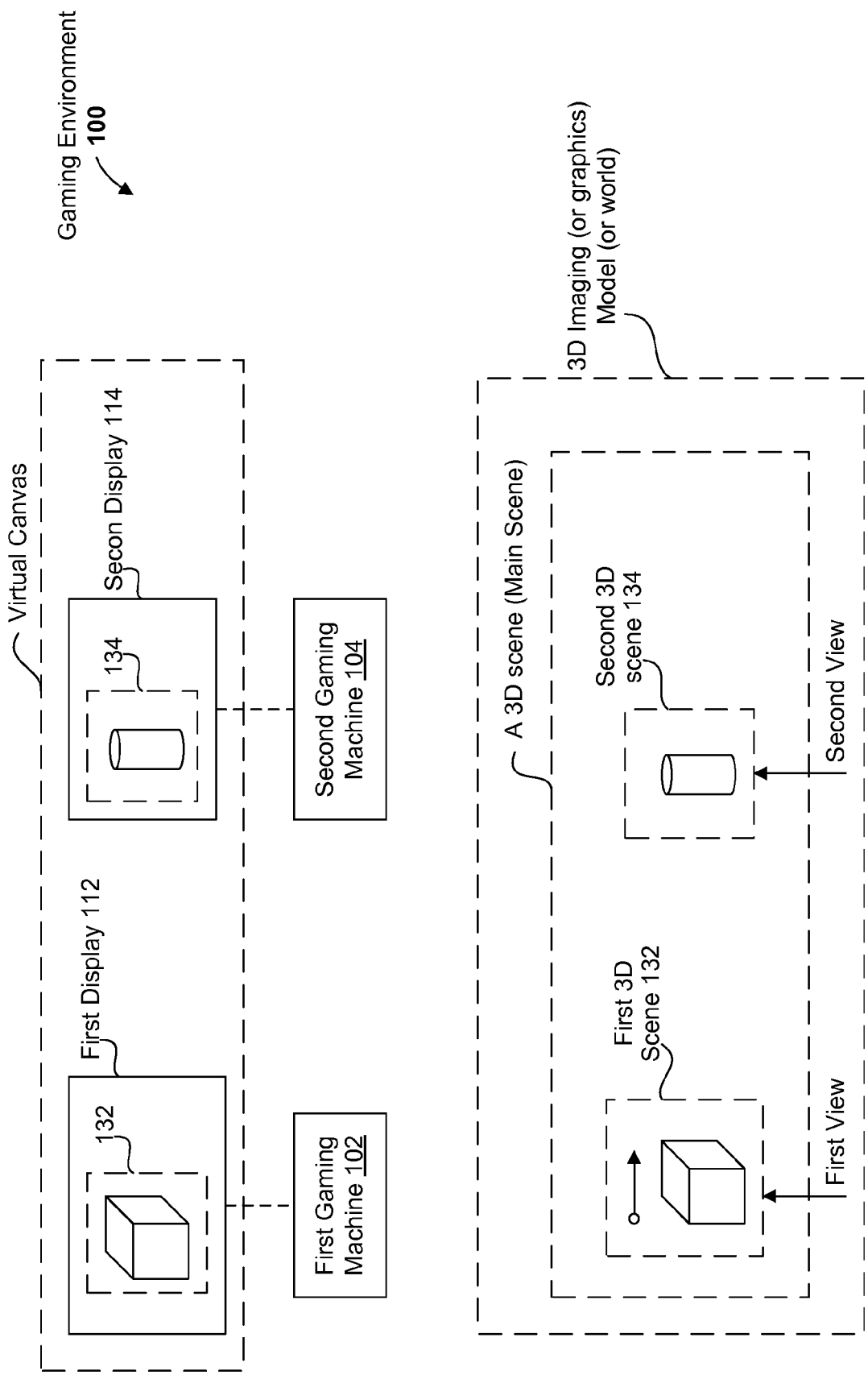
FIG. 1 depicts a gaming environment in accordance with one embodiment of the invention.

As noted in the background section, 3D computer imaging (or graphics) has become increasingly more popular despite many technical problems and challenges presented by this relatively new field of endeavor. Computer Imaging (or graphics) is often an important part of gaming applications (e.g., computer games played on a personal computer or a gaming machine in a casino). As such, improved techniques for 3D imaging (or graphics) are especially useful for gaming applications. Generally, conventional imaging techniques process a 3D image for display (or rendering) on a single display. In a gaming environment, one or more displays are typically provided for a gaming machine (or unit) for displaying images (or graphics) for the game (e.g., images of playing cards are displayed for a video poker). However, it will be appreciated that 3D imaging (or graphics) can be used for many other purposes and applications in a gaming environment (e.g., attracting players, advertising, enhancing the experience of observers).

More generally, it will be appreciated that 3D imaging (or graphics) can extend gaming environments well beyond the conventional limits and that which seemed practical or even imaginable to, among other things, further enhance the player's experience, attract a new generation of players, and dramatically change the look and feel of conventional gaming environments. In particular, the ability to effectively display 3D images (or graphics) across multiple displays provided in a gaming environment has the potential to virtually transform the conventional gaming environments. However, achieving this goal has proved to be especially difficult because in addition to inherent difficulties of 3D imaging, many more obstacles including stringent gaming regulations and/or requirements have to be meet. In a gaming environment, 3D images (or graphics) need to be provided in an organized and/or synchronized manner so that gaming operations are not adversely effected. In a modern gaming environment, various types and shapes of displays can be effectively provided and/or configured for several different types of gaming machines. In addition, multiple displays can be effectively provided and/or configured for a single gaming machine configured to independently perform gaming operations in accordance with various gaming regulations and/or requirements (e.g., gaming machine can independently determine an outcome for a game in accordance with prevailing jurisdictional regulations and requirement). Hence, synchronizing display of multiple 3D images in a manner that does not adversely affect the gaming operations of a gaming environment presents many difficult challenges. Despite these challenges, the ability to effectively display 3D images (or graphics) across multiple displays is extremely valuable especially if it can extent or enhance the game or gaming experience of players.

It will be appreciated that the invention provides techniques for displaying and using 3D imaging (or graphics) in gaming environments. In accordance with one aspect of the invention, 3D images (or graphics) are effectively displayed across multiple displays provided in a gaming environment. It will be appreciated that 3D data can be generated based on a 3D imaging (or graphics) model (or world). More particularly, 3D data can be effectively used to display (or render) multiple 3D images on multiple displays effectively provided or configured for one or more gaming machines in a gaming environment. As such, multiple displays configured for a number of gaming machines can, for example, display various views, parts and/or portions of a 3D scene when the gaming machines are operational for playing one or more games in the gaming environment. The displays can be configured to effectively provide a virtual canvas spanning an area much larger than the size of any single one of the displays. By way of example, the virtual canvas can be provided by several displays configured for several gaming machines in a configuration spanning a relatively large physical area (e.g., a row of gaming machines or an entire floor of a casino). In general, various 3D images (or graphics) can be displayed based on a 3D model (or world) on the virtual canvas effectively provided by the configuration of the displays. In one embodiment, a large 3D scene (or 3D world) can be effectively depicted across the virtual canvas. A human observer can visually connect the individual views, parts and/or portions of a 3D scene displayed on individual displays to effectively observe a more complete scene or a virtual world (e.g., an ocean floor, fish tank, football game). It will be appreciated that the scenes or virtual world can, for example, be presented as a part of a game or used in connection with a game, serve as background for attracting player, or utilized for other applications that may not be directly or even remotely connected to the gaming operations (advertising, news).

In accordance with another aspect of the invention, multiple 3D scenes are effectively displayed across multiple displays as a result of a gaming criteria, event or condition (e.g., a bonus condition causing display of a 3D scene has been met). In one embodiment, a game scene for a game played on an individual gaming machine is effectively displayed as a larger 3D scene across multiple displays configured for multiple gaming machines when a gaming criteria, event or condition is met (e.g., when a slot game played on a single machine generates a particular outcome. The slot game is effectively displayed on multiple machines).

In accordance with yet another aspect of the invention, 3D images (or 3D objects) effectively displayed across multiple displays configured for multiple gaming machines can at least affect and/or complement the game being played on one or more of the gaming machines. The 3D images (or objects) displayed can also be part of an independent game which can, for example, be played at the same time and/or in connection with a game played on an individual gaming machine. In one embodiment, 3D objects are animated in a 3D scene that spans a plurality of displays respectively configured for a plurality of gaming machines. It will be appreciated that animation (or movement) of one or more 3D objects can, for example, be used to trigger a gaming criteria, event or condition (e.g., movement of a 3D object can trigger and/or indicate the start of a bonus period for a game being played in a gaming machine). The gaming criteria, event or condition can be triggered solely based on the animation (or movement) of the 3D object(s) or in a combination with another condition. This other condition can, for example, be a random event (e.g., picking a gaming machine at random), a timing condition (e.g., a timer expiring) and/or a gaming condition (e.g., a gaming machine playing and/or generating a particular outcome for a game played on a gaming machine when movement or animation of a 3D object results in a 3D object being displayed on a display configured for the gaming machine). By way of example, animation of a fish the appears to be swimming across a 3D virtual world can be used to trigger a bonus period for a gaming machine that happens to displays the fish on its display if a winning outcome is generated on the gaming machine before the fish "disappears" (e.g., swims to another display).

Embodiments of these aspects of the invention are discussed below with reference to FIGS. 1-10. However, those skilled in the art will readily appreciate that the detailed description given herein with respect to these figures is for explanatory purposes as the invention extends beyond these limited embodiments.

FIG. 1A depicts a gaming environment 100 in accordance with one embodiment of the invention. Referring to FIG. 1, first and second gaming machines (or unit) 102 and 104 are provided in the gaming environment 100. The first and second gaming machines 102 and 104 can, for example, be configured in a configuration (or bank) of gaming machines that can directly communicate with each other and/or communicate via a central entity or server provided in the gaming environment 100 (not shown). Typically, the first and second gaming machines 102 and 104 are capable of determining a game outcome for one or more games that can be played in the gaming environment 100. In addition, at least first and second displays 112 and 114 are respectively provided by or for the gaming machines in order to support and/or accommodate the games and/or gaming operations. In other words, at least a first display 112 is effectively provided for or by the gaming machine 102 when the first gaming machine 102 is operable (e.g., a display is configured for the gaming machine and/or provided as a part of the gaming environment 100 when the gaming machine is operable to play a game).

Similarly, the second display 114 can be effectively provided by or for the second gaming machine 104 when the second gaming machine 104 is operable. Moreover, it will be appreciated that the first and second displays 112 and 114 can be respectively configured or caused to display first and second 3D scenes 132 and 134. The 3D scenes 132 and 134 can, for example, be associated with a particular 3D scene (a main or larger 3D scene) which is based on a 3D imaging (or graphics) model (or world). As such, the first and second 3D scenes 132 and 134 can, for example, respectively represent different views, parts, and/or portions of a particular (or main) 3D scene which can be part of or based on an even larger 3D scene or imaging model. It will be appreciated that the 3D model (or world) may span or include a relatively larger virtual space and/or various 3D objects modeled. A 3D world can effectively span what would be equivalent to the size of a city. In any case, the first 3D scene 132 can be displayed (or rendered) based on data (a first 3D data) that effectively describes how to display the first 3D scene 132.

Similarly, a second 3D data can be used to display the second 3D scene 134 on the second display 114. Thus, the collection of first and second displays 112 and 114 can be effectively used as a virtual canvass to, for example, depict various views, parts and/or portions of a 3D scene. However, more generally, first and second 3D scenes 132 and 134 can be any 3D scenes. In other words, first and second 3D scenes 132 and 134 need not be based on the same scene, but can generally adhere to the same 3D imaging (or graphics) model (or world) representing views of parts of the same 3D scene (main 3D scenes).

Figure 1B:
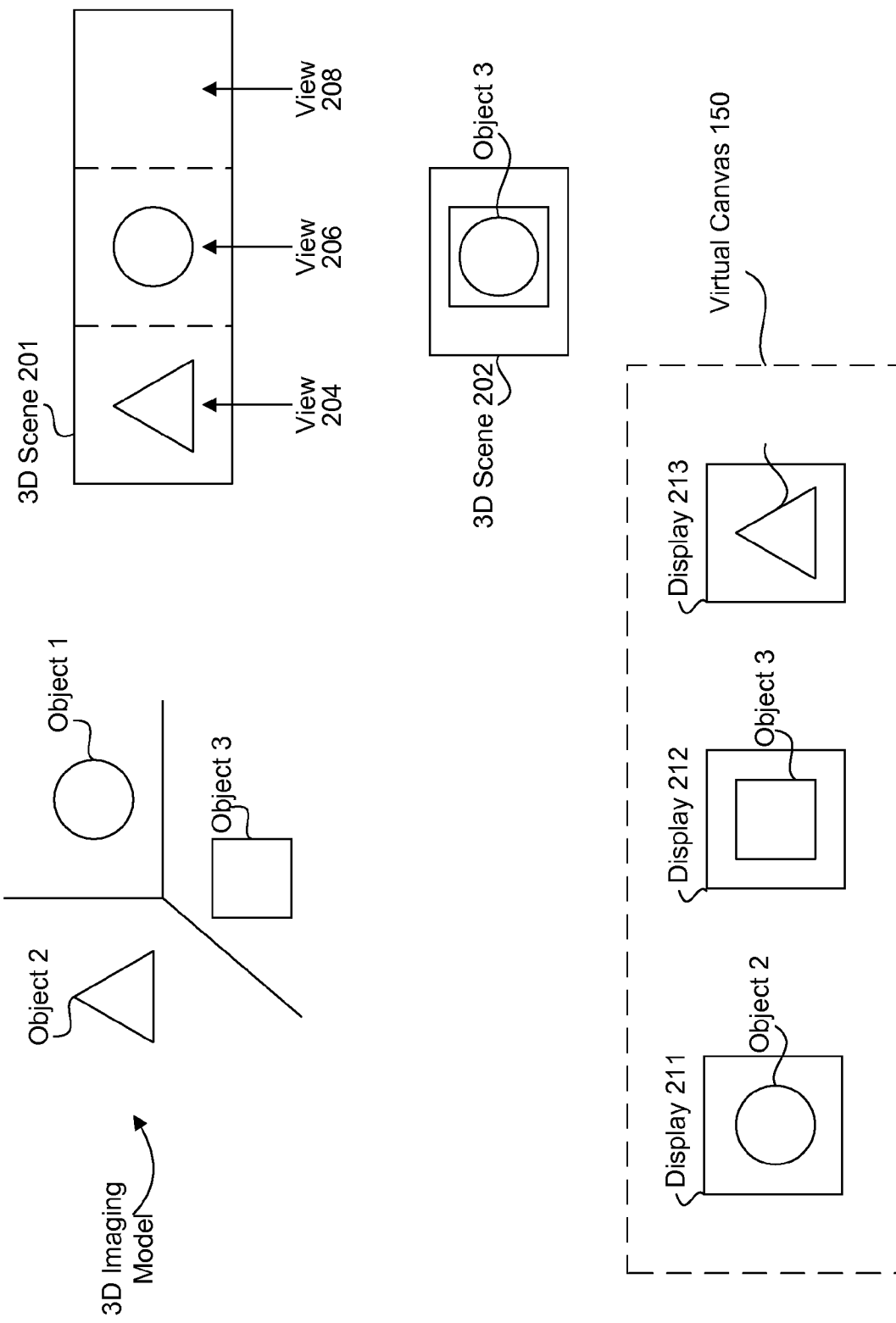

Referring now to FIG. 1B, 3D scenes 201 and 202 are based on a 3D imaging (or graphics) model (or world). Each 3D scene may include various 3D objects arranged in the scene. A 3D scene 201 can be effectively divided into various views, parts and/or portions. By way of example, the 3D scene 201 may be effectively divided into three (parts) based on various views 204, 206 and 208 or into the 3D scene 201. Various views of the scene 201 can be displayed in a collection of displays 211, 212 and 213 forming a virtual canvass 150. It should be noted that views of a 3D scene may vary widely. By way of example, a front view of a 3D scene (or 3D object) can be displayed on a first display while the back view of the same 3D scene (or 3D object is displayed on the second display).

Figure 2:
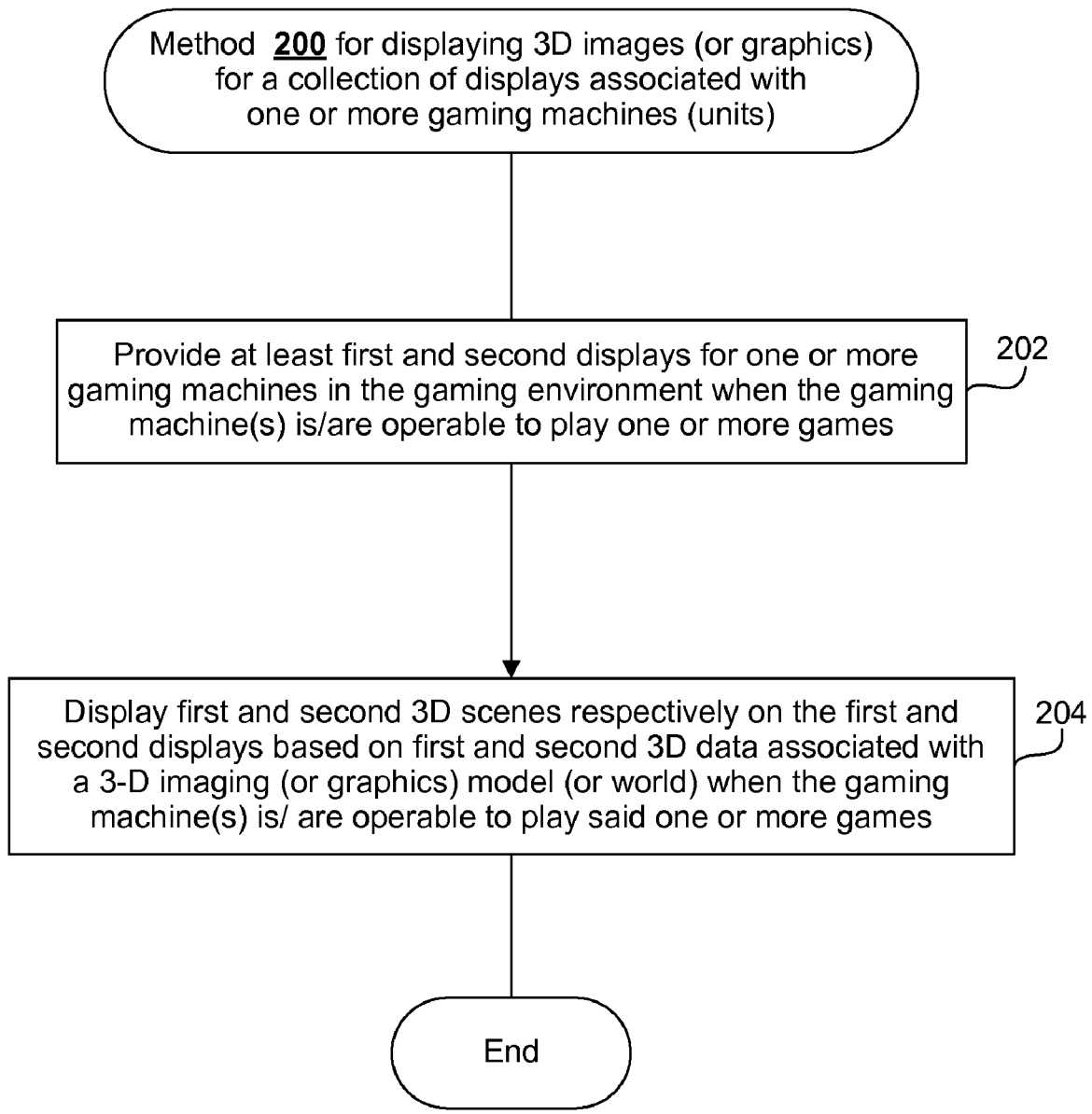
FIG. 2 depicts a method for displaying 3D images (or graphics) for a collection of displays associated with one or more gaming machines in a gaming environment in accordance with one embodiment of the invention.

FIG. 2 depicts a method 200 for displaying 3D images (or graphics) for a collection of displays associated with one or more gaming machines in a gaming environment in accordance with one embodiment of the invention. Initially, at least first and second displays are effectively provided (202) for one or more gaming machines in the gaming environment when the gaming machine(s) are operable for playing one or more games (e.g., reel slots, video slots, video blackjack, video poker). By way of example, one or more displays can be configured for each of the gaming machines in the gaming environment. As such, one or more displays can be effectively provided for playing games, attracting players, and other applications (e.g., advertising, news). When the one or more gaming machines are operational, first and second 3D scenes are respectively displayed (204) on the first and second displays. It should be noted that the first and second 3D scenes can, for example, display a part, portion, or view of the same 3D scene effectively across multiple displays. It will be appreciated that the 3D scene can be directly connected to the game being played (e.g., a game scene), used to complement or add to the game (e.g., an attraction or bounce mechanism for the game), or provide other functions for other applications (e.g., advertising, news). Again, it should be noted that the first and second 3D scenes need not be based on the same 3D scene. In general, the 3D scenes can be independent of each other. As such, the first and second displays can, for example, displays scenes that are based on a different 3D scenes or even 3D models, but for most applications it is generally desirable that the 3D scenes adhere to the same 3D model in order to provide a common theme or a virtual world.

Figure 3:
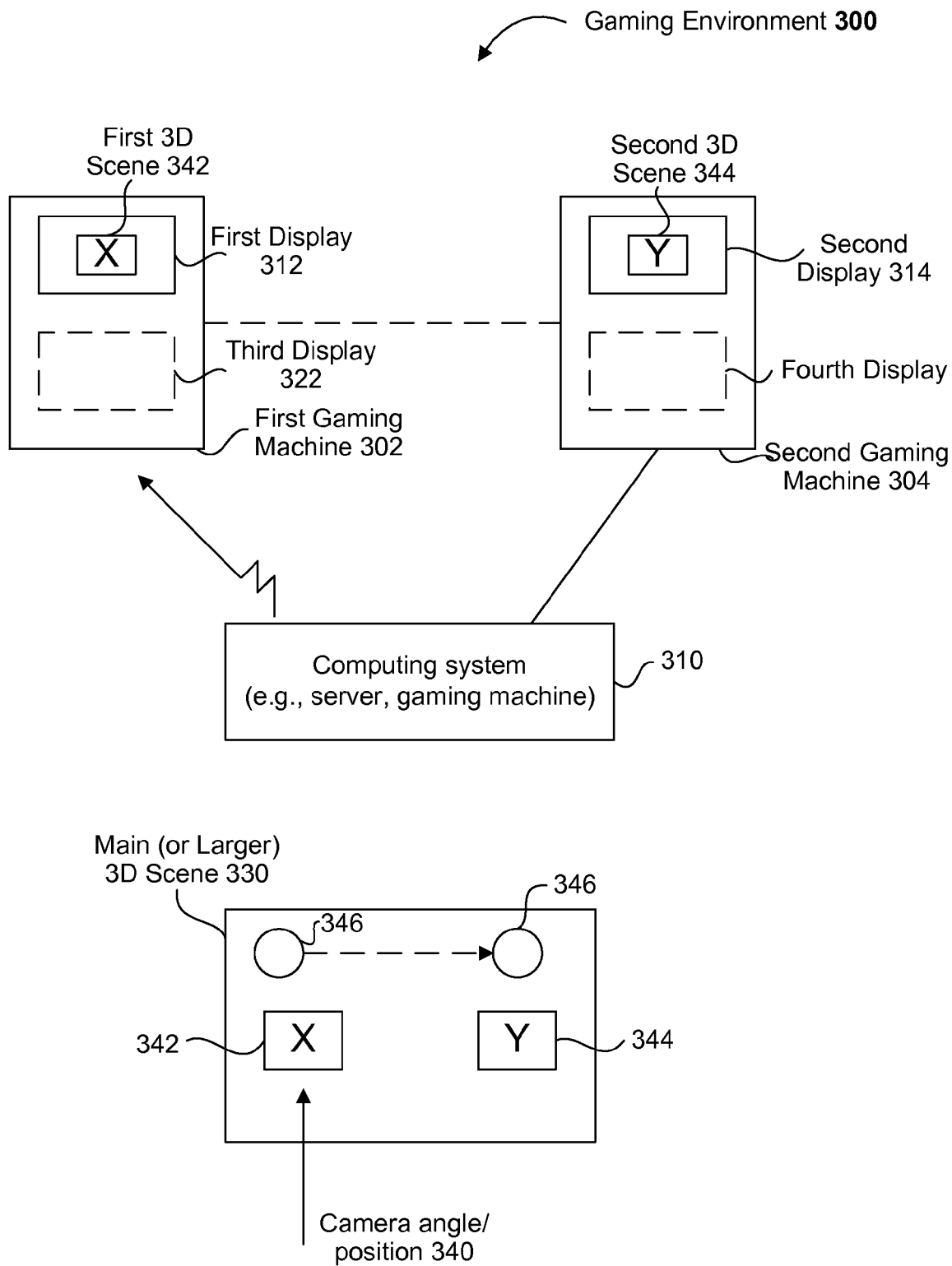
FIG. 3 depicts a gaming environment in accordance with another embodiment of the invention.

FIG. 3 depicts a gaming environment 300 in accordance with another embodiment of the invention. Referring to FIG. 3, first and second gaming machines 302 and 304 are provided in the gaming environment 300. Typically, first and second gaming machines 302 and 304 are capable of independently determining the outcome of one or more games. For example, a person can interact with the first gaming machine 302 to play a game (e.g., mechanical slots, video poker). It should be noted that at least one display is configured or provided for each of the first and second gaming machines 302 and 304. For example, first and second displays 312 and 314 are configured respectively for the first and second gaming machines 302 and 304. Typically, at least one display can be used to display information related to a game being played (gaming information), but other information such as advertisement, attractions designed to attract players may be played on the same and/or additional displays.

It will be appreciated that when at least the first gaming machine 302 is operable, it can be determined whether to effectively display information across multiple displays (e.g., 312 and 314) in the gaming environment 300. By way of example, it can be determined whether to effectively display information across first and second displays 312 and 314 respectively configured for first and second gaming machines 302 and 304. The information displayed across multiple displays can, for example, be gaming information that effectively allows a person (or player) to play a game on multiple displays (312 and 314) configured for multiple gaming machines (302 and 304), thereby, among other things, allowing for a more exciting gaming experience. Other types of information (e.g., advertising, attractions) can be displayed in a similar manner. In general, display of any type of information (or data) across multiple displays can be based on a condition or an event (e.g., a gaming condition, randomly generated triggering event). By way of example, when first gaming machine 302 is operational and/or during game play, a gaming condition (e.g., when a certain set of cards are played) can trigger display of information across the first and second displays 312 and 314.

Referring to FIG. 3, the first and second display 312 and 314 can each respectively displays first and second 3D scenes 312 and 314 based on the same 3D scene 330 (or 3D model). More particularly, the first and second 3D scene 342 and 344 can depict a part, portion or view of a (main or larger) 3D scene 330, thereby effectively displaying the main 3D scene 330 across first and second displays 312 and 314.

Referring to FIG. 3, a computing system 310 effectively synchronizes display of first and second 3D scenes 342 and 344. It will be appreciated that the computing system 310 can, for example, be a server or host computing machine, and/or another gaming machine configured with the capability to synchronize display of multiple scenes across multiple displays. More particularly, computing system 310 can determine whether to effectively display the main (or larger) 3D scene 330 effectively across the first and second displays 312 and 314 as first and second 3D scenes 342 and 344. Alternatively, the computing system 310 can receive an indication or request for displaying first and second 3D scenes 342 and 344 across first and second displays 312 and 314. This indication or request can, for example, be sent by the first gaming machine 302. In any case, when it is determined to display first and second 3D scenes 342 and 344 across first and second displays 312 and 314, a 3D scene is determined or received by the computing system 310. By way of example, the main (or larger) scene 330 can be determined by the computing system 310 or received from the first gaming machine 302 during game play (e.g., a 3D game scene related to game being played on the first gaming machine 302 can be sent via a wireless or wired connection to the computing system 310).

Typically, the computing system 310 serves a central entity that effectively synchronizes display of 3D scenes 342 and 344. The computing system 310 can, for example, determine first and second 3D data needed respectively to render (or display) first and second 3D scenes 342 and 344. As such, the computing system 310 can, for example, determine a camera angle and/or position for displaying each of the first and second 3D scenes 342 and 344. By way of example, camera angle and/or position 340 can be determined by the computing system 310 and sent to the first gaming machine 302 in order to allow the first gaming machine 302 to render (or display) the first 3D scene 342. Those skilled in the art will appreciate that the determination of camera angle and/or position 340 can, for example, be based on the physical position (or location) of gaming machines and relative distance between the gaming machines 342 and 344. Also, it will be appreciated that a gaming machine can render (or display) a 3D scene by processing (or calculating) data that effectively represents the main 3D scene 330.

As such, in addition to camera angle and/or position 340, additional data such as 3D data for the main scenes 330 and/or 3D objects in the scene can be sent by the computing system 310 to the gaming machines (302 and 304) if needed (i.e., gaming machine(s) do not have the information). General data for the 3D main (or larger) scene 330 can be referred to as base 3D data. Accordingly, the gaming machines 302 and 304 can effectively display (or render) first and second 3D scenes 342 and 344 based on the combination of 3D base data and individual (e.g., view specific) 3D data that can effectively indicate how to render (or display) a particular view, portion and/or part of a 3D scene. The individual 3D data can, for example, include a camera angle and/or position for effectively displaying (or rendering) a perspective view of the main (or larger) scene 3D (e.g., first and second scenes 342 and 344 which effectively represent first and second views and/or parts or the main (or larger scene) 330.

It should be noted that computing system 310 can effectively cause displays of graphics (or animations) made of a number of 3D scenes displayed in sequence to give the appearance of movement or animation. It should also be noted that the main 3D scene 330 can include a number of 3D object based or defined in a 3D imaging (or graphics) model (or world). Furthermore, a 3D object can in effect be a "dynamic" object that can be moved around in various scenes as a part of the 3D graphics (or animation) process.

Referring to FIG. 3, a dynamic 3D object 346 can be part of the main scene 330 and effectively moved in the 3D scenes 346 and/or a lager 3D. In other words, object 346 may appear to move from the display 312 to the display 314 or vice versa. The apparent movement of dynamic objects will also be described below in reference to a gaming environment.

Figure 4A:
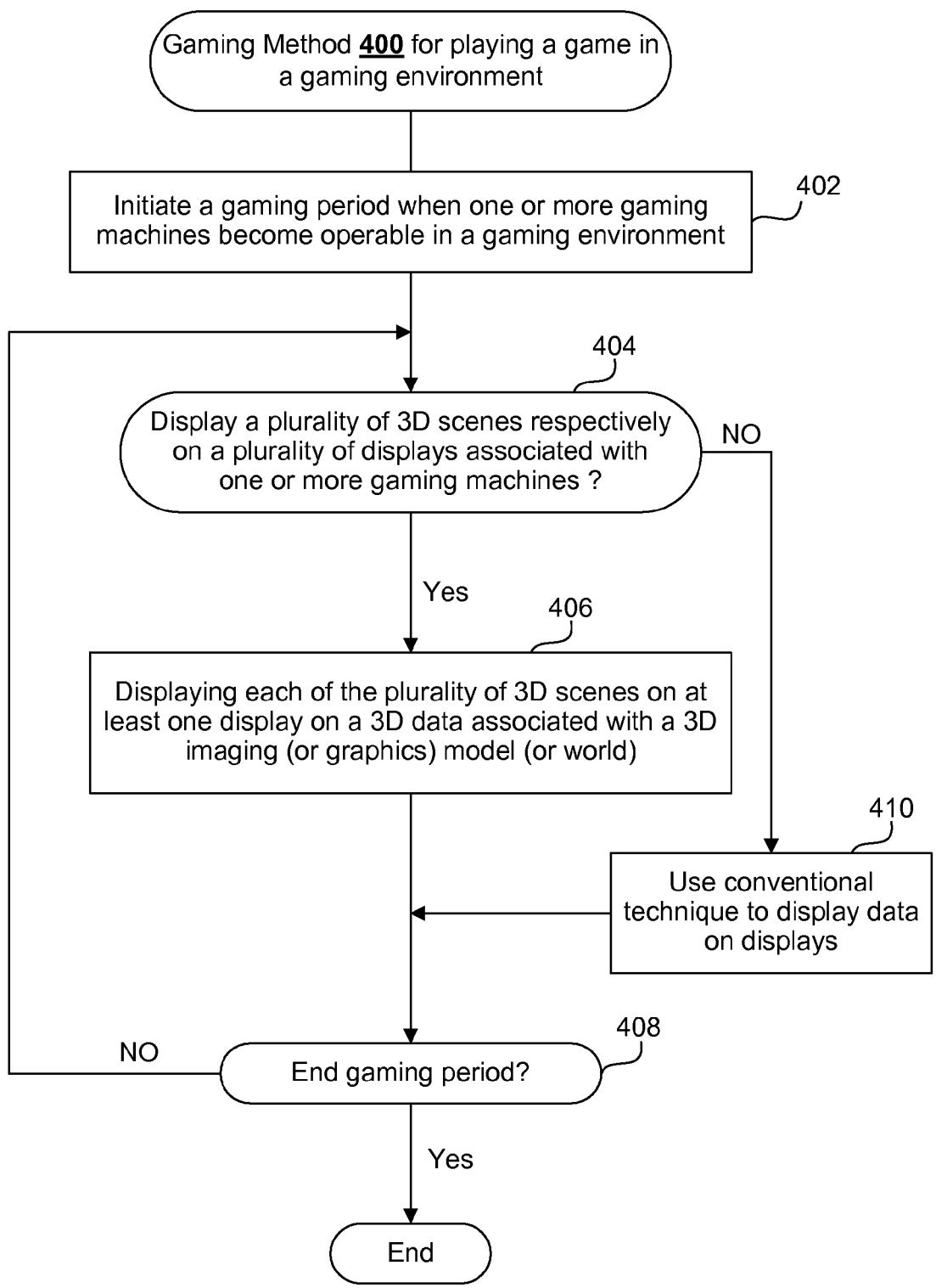
FIG. 4 depicts a method for playing a game on one or more gaming machines (units) in gaming environment in accordance with embodiment of the invention.

FIG. 4A depicts a method 400 for playing a game on one or more gaming machines (units) in a gaming environment in accordance with embodiment of the invention. Typically, each gaming machine can independently determine the outcome of a game in accordance with stringent regulations, requirements and/or preferences. Initially, a gaming period is initiated (402) for one or gaming machines in the gaming environment. During the gaming period, each gaming machine is operational for playing one or more games in the gaming environment. Next, it is determined (404) whether to display a plurality of 3D scenes respectively on the displays associated with the one or more gaming machines that are operational in the gaming environment. Typically, the plurality of 3D scenes is to be displayed in an organized and/or synchronized manner. As such, 3D data based on a 3D imaging (or graphics) model (or world) and subsequently used to, for example, display a 3D scene in part or in its entirety on each display. In general, the determination (404) of whether to display the 3D scenes can be based on a criterion or occurrence of an event. By way of example, a timer can be used to periodically initiate display of multiple 3D scenes on multiple displays, or a gaming event or condition (e.g., drawing a particular hand, wining a number of times) can effectively trigger display of the 3D scenes. In any case, if it is determined (404) to display the 3D scenes on the displays, each of the 3D scenes are displayed (406) on at least one display based on 3D data typically associated with a 3D imaging (or graphics) model (or world). Thereafter, it is determined (408) whether to end the gaming period and the gaming method 400 can end accordingly. Gaming period can end, for example, when a human operator decides to end the gaming period. It should be noted that if it is determined (404) not to display the 3D scenes on multiple displays, a conventional displaying technique is used to display data on the displays. In effect, the gaming method 400 can continue to conventionally display (410) data until it is determined (404) to display a plurality of 3D scenes or it is determined (408) to end the gaming period. The gaming method 400 ends when it is determined (408) to end the gaming period.

Figure 4B:
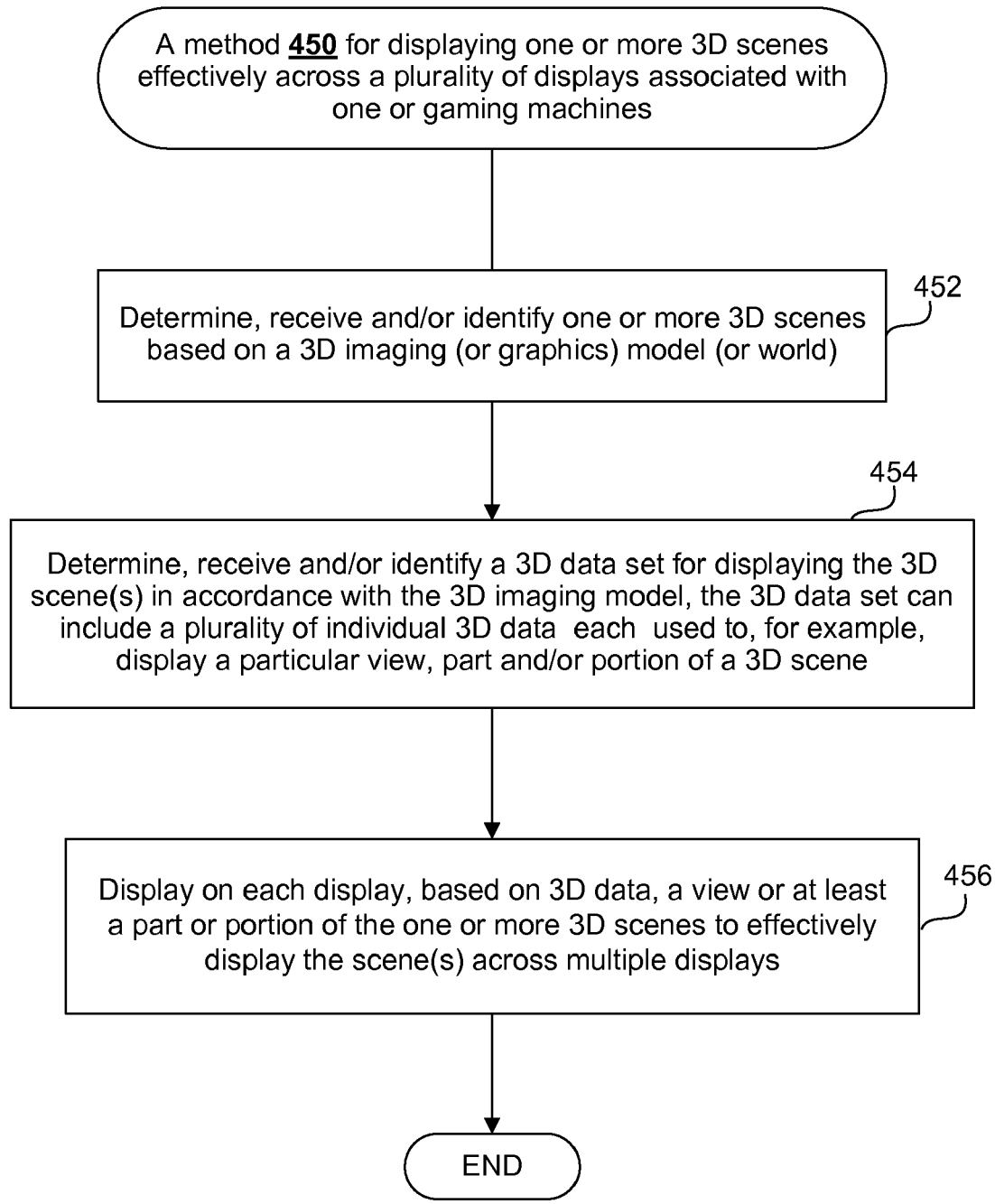

FIG. 4B depicts a method 450 for displaying one or more 3D scenes effectively across a plurality of displays associated with one or more gaming machines in accordance with one embodiment of the invention. Typically, each gaming machine can independently determine the outcome of one or more games in accordance with various gaming regulations, requirements and/or preferences. Initially, one or more 3D scenes are determined, received and/or identified (452) based on a 3D imaging (or graphics) model (or world). Next, a 3D data set for displaying the one or more 3D scenes are determined, received and/or identified (454). The 3D data set can be determined based on a particular 3D imaging model and includes data needed to display the one or more 3D scenes across multiple displays. As such, the 3D data can effectively provide individual (or display-specific) 3D data for each one of the displays. Each individual 3D data component in the 3D data set can, for example, be specific to a particular view, part or portion of a 3D scene. As such, each individual 3D data (or display-specific 3D data) can, for example, effectively identify a particular camera angle and/or position for displaying a particular 3D scene (or main scene). The 3D data set can further include the base (or general) data needed to render (or display) the main 3D scene from various camera angles and/or positions. Accordingly, 3D data (base and/or display-specific 3D data) is used to display (456) a view or at least a part or portion of the one or more 3D scenes on each one of the displays to effectively display the scene(s) across multiple displays. The method 450 ends following the display of a view or at least a part or portion of the one or more 3D scene on each one of the plurality of displays associated with the one or more gaming machines in the gaming environment.

Figure 5:
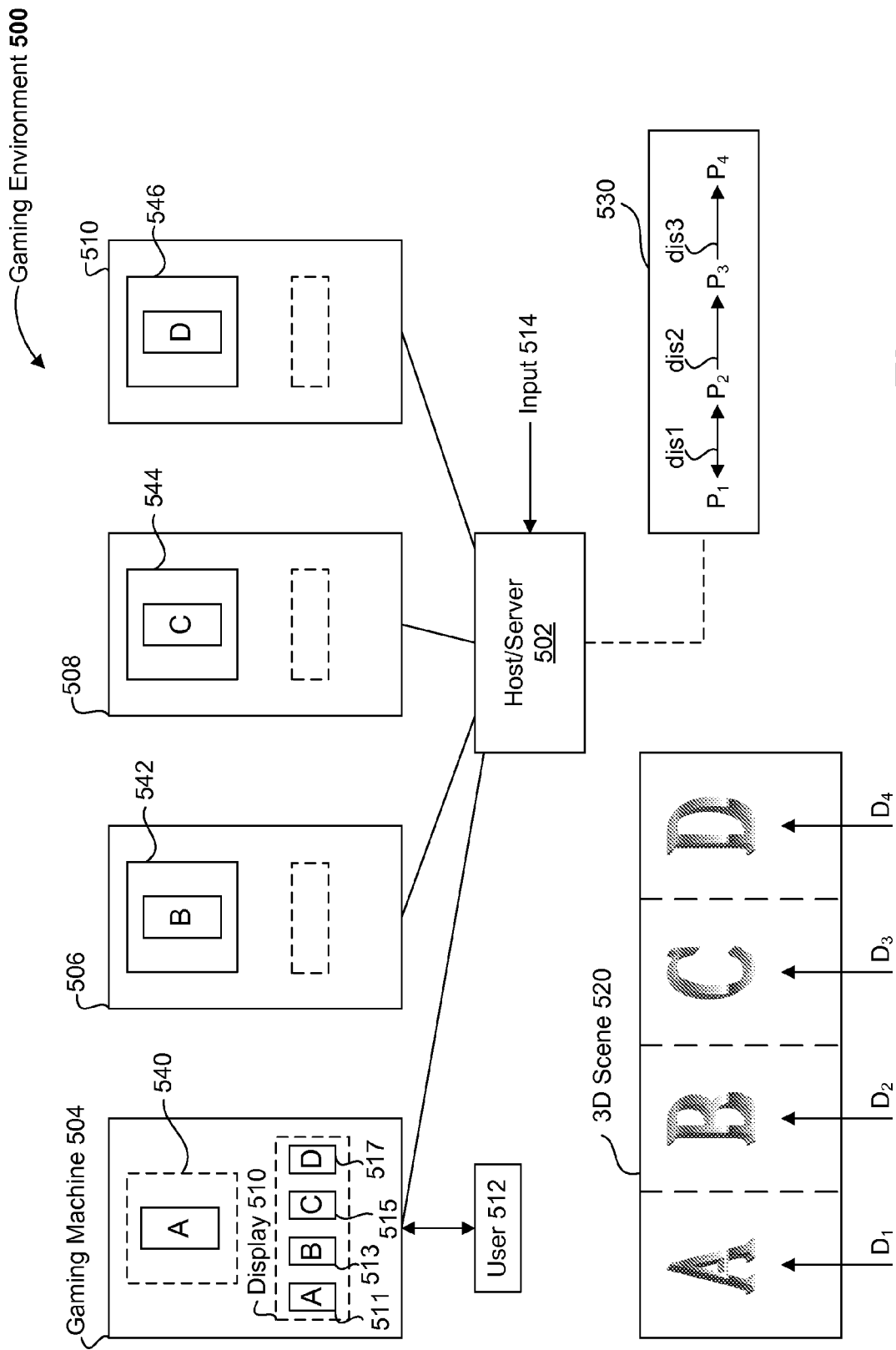
FIG. 5 depicts a gaming environment in accordance with one embodiment of the invention.

FIG. 5 depicts a gaming environment 500 in accordance with one embodiment of the invention. Referring to FIG. 5, a host/server 502 can communicate with gaming machines 504, 506, 508 and 510. In the gaming environment 500, at least one gaming machine 504 is capable of independently determining the outcome of a game (e.g., reel or mechanical slots, video slots, video poker). The game can be played using at least one display (e.g., 510). By way of example, four (4) individual virtual reels 511, 513, 515 and 517 may be displayed for a video slot game where each reel slot may display one or more 3D objects or symbols (A, B, C and D) during game play when a user 512 interacts with the gaming machine 504. The gaming machine 504 can detect a gaming condition or event that triggers display of the same content (reels 511, 513, 515 and 517) displayed on display 510 across multiple displays. The gaming condition or event can, for example, be associated with a bonus mechanism for a particular outcome or sequence of events (e.g., receiving, displaying A, B, C and D). In any case, when a gaming event or condition is detected, the gaming machine 504 can effectively report it to the host/server 502. Alternatively, the host/server 502 can be configured to detect an event or condition based on information communicated by the gaming machine 504 or entirely on its own (e.g., detect an event by setting a timer or based on input 514 from an operator). In general, it is determined whether a criterion has been met to trigger display of gaming information effectively across the displays 540, 542, 544 and 546 of the gaming machines 504, 506, 508 and 510. If the criterion is met, a 3D scene 520 representative of the reels displayed on display 510 is determined or received. By way of example, the gaming machine 504 can store the 3D scene and subsequently send it to the host/server 502. Alternatively, the host/server 502 can determine the 3D scene on its own or based on information received from the gaming machine 504. In any case, 3D data can be used to effectively display the 3D scene 520 across the displays 504, 506, 508 and 510 associated with the gaming machines 504, 506, 508 and 510. More particularly, individual data sets D1, D2, D3 and D4 are determined to respectively allow each of the gaming machines 504, 506, 508 and 510 to display a respective view, part and/or portion of the 3D scene 520. Typically, the host/server 502 determines the data (D1, D2, D3 and D4) needed by each gaming machine to display the appropriate or respective view, part and/or portion of the 3D scene 520. The host/server 502 can, for example, determine the 3D data based on the position of each gaming machines (P1, P2, P3 and P4) and the relative distances (dis1, dis2 and dis3) between them in what can be considered a virtual gaming area or canvass 530. Those skilled in the art will appreciate that host/server 502 can be configured to determine, detect, and/or obtain the information (e.g., positions and distances between virtual machines) needed to determine the 3D data that each of the gaming machines 504, 506, 508 and 510 needs to display its respective view, part and/or portion of the 3D scene 520. As such, the host/server 502 can determine a 3D data set including data D1, D2, D3 and D4 to respectively forward to gaming machines 504, 506, 508 and 510. It should be noted that it is also possible to configure each gaming machine to determine its own 3D data, for example, by detecting its own position and distance or by manually providing the gaming machine its position and distance.

An individual data (e.g., D1) can, for example, be determined based on a camera position and/or camera angle. By way of example, the host/server 502 can determine a respective camera position and/or camera angle for each for the gaming machines 504, 505, 508 and 510. It will be appreciated that the data representative of the general 3D scene 520 can be transmitted to and/or stored on each of the gaming machines 504, 506, 508 and 510. This data can also be referred to as base 3D data for the 3D scene 520. In any case, general or base 3D data can be used by a gaming machine (e.g., 504) to render or display a particular view, portion and/or part of the 3D scene 520 as effectively identified by the individual (or display-specific) data D1, D2, D3 and D4. Accordingly, each gaming machine can display (or render) its own respective view, part and/or portion of the 3D scene 520 based on its display-specific data (D1, D2, D3 and D4) which can, for example, provide a camera angle and position. As a result, the 3D scene 520 can effectively be displayed across multiple displays (540, 542, 544 and 546). Moreover, it will be appreciated that a game scene can effectively be played across multiple displays. Referring to FIG. 5, the reels 511, 513, 515 and 517 are displayed across the displays 540, 542, 544 and 546 to give the appearance of a much larger game scene, namely, the slot reels. In other words, as the user 512 interacts with the gaming machine 504, game play can be effectively extended to displays configured for other gaming machines (506, 508 and 510). In case of a slot or reel game, movement of reels can be effectively simulated across the displays 540, 542, 544 and 546.

Those skilled in the art will appreciate that 3D graphics (or animation) can be used to simulate movement of the reels. In general, graphics (or animation) can be modeled using a 3D model (or world) that includes various 3D objects (e.g., individual 3D reels, 3D objects on 3D reels). As such, gaming animation (e.g., movement of reels) can be accomplished by displaying a number of 3D scenes (e.g., 3D scene 520) displayed in sequence. Moreover, these 3D scenes can be effectively displayed across the displays 540, 542, 544 and 546 in a similar manner as the 3D scene 520. The host/server 502 can, for example, determine a camera angle and/or position for each scene and update 3D scene as necessary. Each gaming machine 504, 506, 508 and 510 can also render (or display) an updated 3D image based on an updated camera angle and/or position. In this way, gaming graphics or animation can be effectively extended across multiple gaming machines as a user interacts with one gaming machine (e.g., gaming machine 504). It should be noted that host/server 502 can also be configured to determine which gaming machines are to be used for what may be considered as an extended or bonus play using multiple gaming machines. The determination of which gaming machines are to be used for extending the game can be done during the game play in a dynamic manner where, for example, gaming machines that are not being used by a player are utilized and/or one or more displays (e.g., upper display) configured for gaming machines are selected for displaying data. In general, the host/server 502 can effectively synchronize display of 3D data on multiple displays associated or configured with one or more gaming machines. To further elaborate, synchronization of 3D Images (or graphics) is further discussed below.

Figure 6:
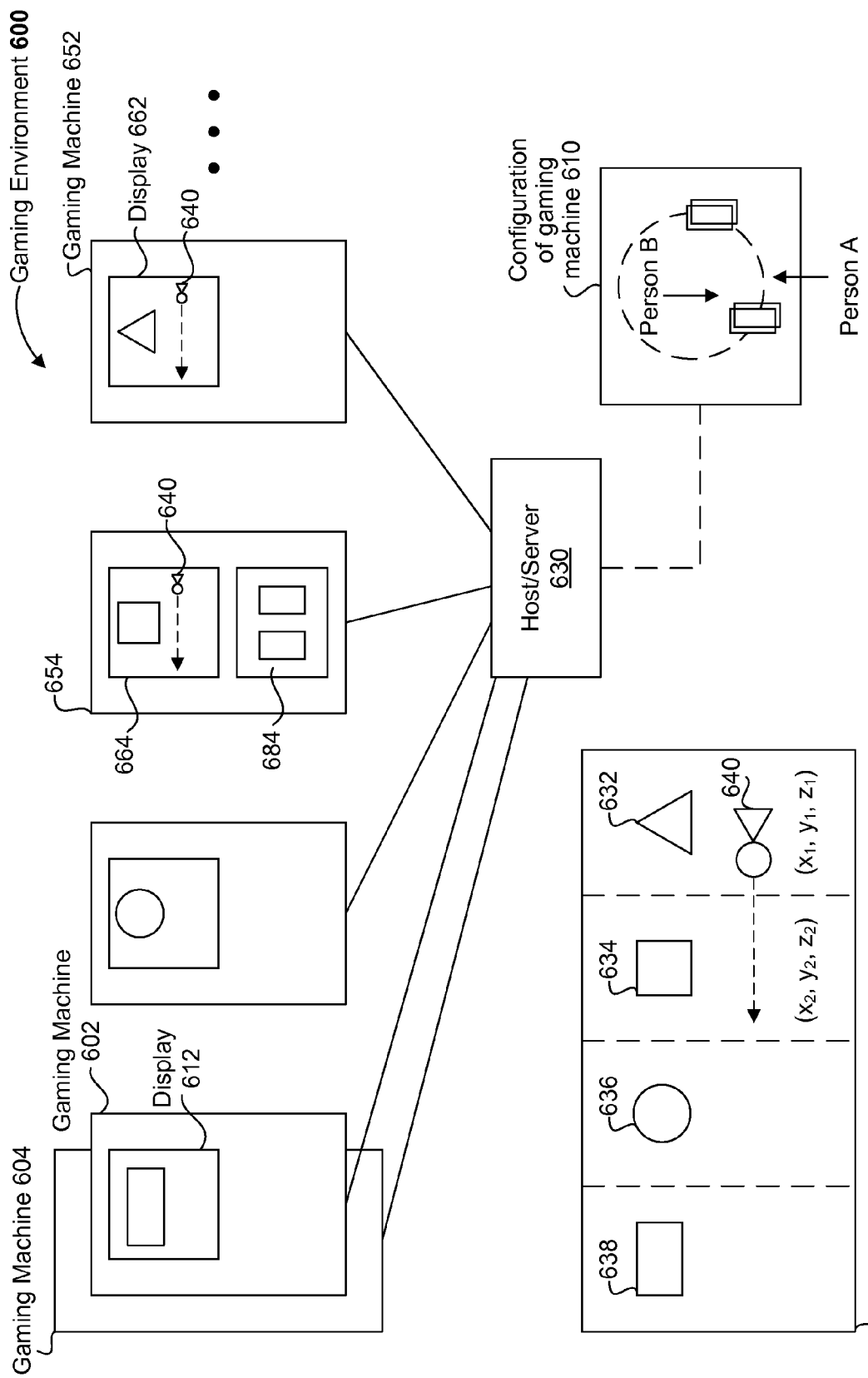
FIG. 6 depicts a gaming environment in accordance with yet another embodiment of the invention.

FIG. 6 depicts a gaming environment 600 in accordance with yet another embodiment of the invention. Referring to FIG. 6, several gaming machines ($G_1, \ldots, G_n$) are configured in a configuration (or bank) of gaming machines represented as a configuration 610. The configuration 610 can, for example, be circular where the gaming machines ($G_1, \ldots, G_n$) in a casino floor. Furthermore, gaming machines can be coupled in pairs and effectively used to display front and rear views of 3D scenes (or a 3D world). By way of example, gaming machines 602 and 604 can be placed back to back where a display 612 of the gaming machine 602 is used to display the front view of a 3D scene 620 and another display (not shown) configured for the gaming machine 604 is used to effectively display the back view of the 3D scene 620.

As such, the front view of a 3D object (e.g., a fish) 640 can be shown on the display 612 while the back view of the 3D object is shown on another display (not shown) directly or approximately behind the display 612 (a display configured for the gaming machine 601). Hence, the front view of a 3D scene (or world) and/or various 3D objects therein can be observed by a Person A when traversing the outer circle in the configuration 610 while the back view is visible by a Person B traversing the inner circle of the game configuration of gaming machines 610. In general, the 3D scene 620 can be based or part of a 3D imaging (or graphics) model (or world) where an entire virtual world (e.g., an ocean, fish tank) is represented using various 3D objects arranged in various 3D scenes.

In one embodiment, a host/server 630 effectively synchronizes displays of multiple 3D scenes on multiple displays configured for the gaming machines ($G_1, \ldots, G_n$) arranged in the configuration (or bank) of gaming machine 610. More particularly, each gaming machine ($G_1, \ldots, G_n$) stores 3D base data for the graphics model (or world) depicted (e.g., a fish tank). By way of example, a 3D virtual fish tank can be modeled and base data needed to display at least a particular scene of the entire 3D virtual fish tank can be stored on each gaming machine. It will be appreciated that 3D objects in the 3D model (or world) can be characterized as static or dynamics objects. Referring to FIG. 6, static objects 632, 634, 636 and 638 of a 3D scene 620 represent objects that need not be animated (or moved). A static object can, for example, be a rock, treasure chest that is displayed in the same position continually. On the other hand, a dynamic object 640 (e.g., a fish 640) can be animated (or moved) (e.g., in the virtual 3D fish tank). In general, the dynamic object 640 is moved from a point or portion ($X_1, Y_1, Z_1$) to another point or portion ($X_2, Y_2, Z_2$) using 3D data and/or 3D variables (e.g., scaling, rotation). In order to animate the movement of the dynamic object 640 in a 3D world displayed across several displays in the configuration 610, the host/server 630 determines the data needed to simulate or animate movement of the dynamic 3D object 640. In one embodiment, the host/server 630 sends animation data including scaling and rotation vectors to one or more gaming machines as needed. The gaming machine can effectively use the animation data to achieve the animation. Typically, the gaming machines perform additional calculations on the animation data in order to generate actual data used to render (or display) 3D scenes. By way of example, animation data for moving the dynamic object 640 can be determined by the host/server 630 and sent to the gaming machine 652. The gaming machine 652 can then use the animation data to effectively move the dynamic object 640 in the 3D scene it displays on a display 662. It will be appreciated that the gaming machine 652 can display (or render) the graphics that simulates movement of the object 640 based on animation data provided, for example, as one or more vectors that indicate the direction, velocity, acceleration, scale, and/or rotation for the movement. In one embodiment, the gaming machine 652 extrapolates the movement of the dynamic object 640. More particularly, the host/server 630 effectively sends periodic updates for the animation data (e.g., every one or more seconds). When an update is received, the gaming machine 652 can then correct or synchronize its animation which may have been extrapolated based on the last animation data received from the host/server 630. Similarly, animation data can be sent to the gaming machine 654 to effectively move the dynamic 3D object 640 across its depicted 3D scene on the display 664. In this way, a dynamic 3D object can be effectively displayed and moved across multiple displays. It should be noted that the front and back view of a static or dynamic object can be displayed so that a person can, for example, stand to watch the "front" view of a fish swimming across the fish tank depicted in the configuration 610 while the person B can stand and watch the "back" view of the fish as it swims across the fish tank.

Referring to FIG. 6, it will also be appreciated that "movement" of the dynamic 3D object 640 can be effectively used for various gaming related activities. For example, movement of the dynamic 3D object 640 can be used for a bonus mechanism for triggering bonus play on a gaming machine 654 when the object 640 (e.g., a fish) is displayed on display 664 and a particular game outcome occurs (e.g., a particular hand is drawn and/or a player wins). During the bonus play or time, the game played on the gaming machine 654 may be effectively projected on multiple displays configured for multiple gaming machines in the configuration of gaming machine 610. As such, the content relating to the game displayed on a display 680 can, for example, be shown on multiple displays during a bonus period where additional rewards and incentives (e.g., higher than normal pay) can be provided. Hence, the movement of the 3D object 640 can effect or complement the game and/or cause a game to played across multiple displays. More generally, it will be appreciated that display of multiple 3D scenes on multiple displays can change various aspects of gaming environment including normal and bonus game play, as well as improving the general appearance and attractiveness of the gaming environment. In a gaming environment, 3D images, graphics and objects can be closely integrated with various gaming concepts (e.g., normal or bonus game time) or serve as a background to gaming operations or be provided for general enjoyment and use of various applications not directly related to gaming (e.g., advertisement, news).

Figure 7:
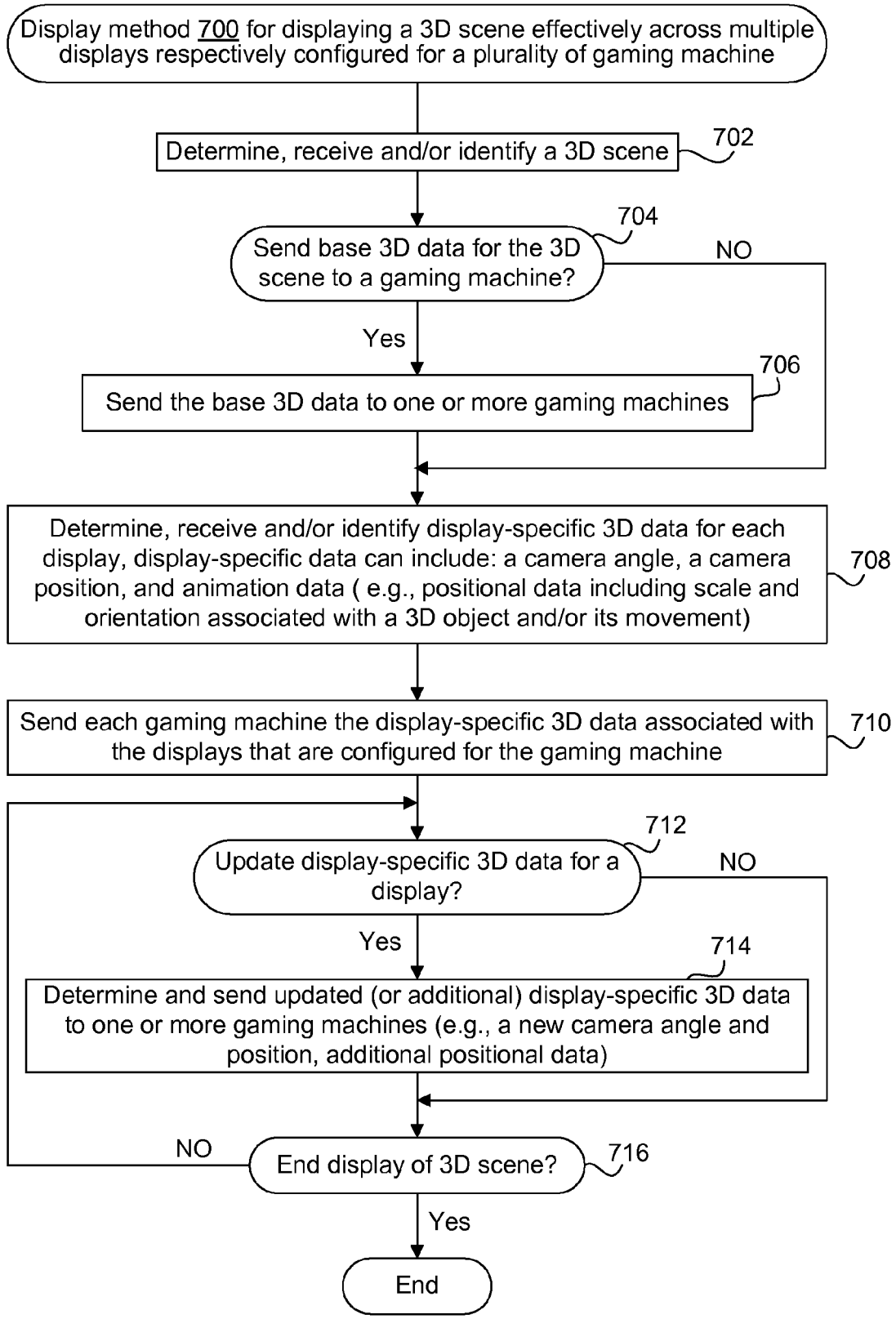
FIG. 7 depicts a display method for displaying a 3D scene effectively across multiple displays respectively configured for a plurality of gaming machine in a gaming environment in accordance with one embodiment of the invention.

FIG. 7 depicts a display method 700 for displaying a 3D scene effectively across multiple displays respectively configured for a plurality of gaming machine in a gaming environment in accordance with one embodiment of the invention. The display method 700 can, for example, be used by a server/host computing system that communicate with the gaming machines in the gaming environment (e.g., host/server 630 shown in FIG. 6). Initially, a 3D scene is determined, received and/or identified (702). Next, it is determined (704) whether to send base (or general) 3D data to one or more gaming machines. Typically, the base 3D data includes general data for a 3D scene and/or 3D imaging (or graphics) model (or world). As such, the base 3D data can be used to generate actual data needed to display (or render) the 3D scene (e.g., perform calculations to determine a particular view, part and/or position of a 3D scene or model). By way of example, base 3D data can be sufficient to effectively display an entire 3D scene (or world) and/or various views or portions of the 3D scene based on various camera positions and angles. Accordingly, base 3D data can be sent (706) to one or more gaming machines if it is determined (704) to send the base 3D data. Thereafter, data specific to each display (or display-specific 3D data) is determined (708). In general, display-specific data is any additional or complementary data needed to render a particular 3D scene on a particular display. Thus, the combination of the base 3D data and display-specific 3D data can be used to display (or render) a particular view of the 3D scene. By way of example, the display-specific 3D data can include a camera angle, camera position, and animation data. A camera angle and position can be used to display a particular view, part and/or portion of a 3D scene. Animation data can include data that effectively indicates how to move one or more dynamic 3D objects in a 3D scene. By way of example, animation data can be provided as positional data including scaling and orientation data associated with one or more 3D objects and/or their movement. Those skilled in the art will appreciate that positional data can, for example, be provided in a vector form (e.g., 3×3, 4×4 matrices).

After the display-specific 3D data has been determined, received and/or identified (708), the display-specific 3D data is sent to each gaming machine designated to display a 3D scene. By way of example, a first display-specific data is sent to a first gaming machine that has a first display configured in order to display a first portion or view of a 3D scene on the first display. Similarly, a second display-specific 3D data is sent to a second gaming machine in order to display a second portion or view of the same 3D scene on a second display configured for the second gaming machine, and so on. Again, it will be appreciated that based on the display-specific 3D data a gaming machine can perform additional calculations to determine actual data needed to display (or render) a desired view and/or at least a portion of the 3D scene. Accordingly, a 3D scene can be effectively displayed across multiple displays.

Thereafter, it is determined (712) whether to update the display-specific data for one or more displays. Accordingly, updated (or additional) display-specific data can be sent (714) to one or more gaming machines. By way of example, a new (or updated) camera angle and position can be determined and sent (714) to one or more gaming machines and/or additional positional data can be determined and sent to a gaming machine for further processing in order to effectively change or update a particular portion or view of the 3D scene and/or move one or more 3D objects in a depicted 3D scene. As such, gaming machines can receive updated (or additional) display-specific data to effectively update or completely change their respective views of a 3D scene effectively displayed across multiple displays and/or or simulate movement of a 3D object in the 3D scenes depicted on displays configured for them. After the updated (or additional) display-specific 3D data has been sent (714) or if it is determined not to send any updated (or additional) display-specific 3D data, it is determined (716) whether to end display of 3D scene across multiple displays. Determining (716) of whether to end display of the 3D scene across multiple displays can, for example, be made based on a gaming event or condition (e.g., end of bonus play, losing a game). In general, this determination (716) can be made based on a criterion, event and/or input. The display method 700 ends if it is determined (716) to end displaying the 3D scene across multiple displays. However, if it is determined (716) not to end display of the 3D scene across multiple displays, it is determined (712) whether to update the display-specific 3D data and the method 700 proceeds in the same manner as discussed above. In effect, display-specific 3D data can be updated as needed until it is determined (716) to end display of the 3D scene across multiple displays. It will be appreciated that 3D graphics or animation can also be achieved effectively across multiple displays as multiple 3D scenes can be displayed using, for example, the exemplary display method 700. More particularly, various scenes can be determined or received and displayed, based on 3D base data and any additional display-specific data, for each particular display in order to effectively cause display of 3D graphics or animation in a synchronized and/or organized manner. The display method 700 ends following the determination (716) to end displaying the 3D scene.

Figure 8:
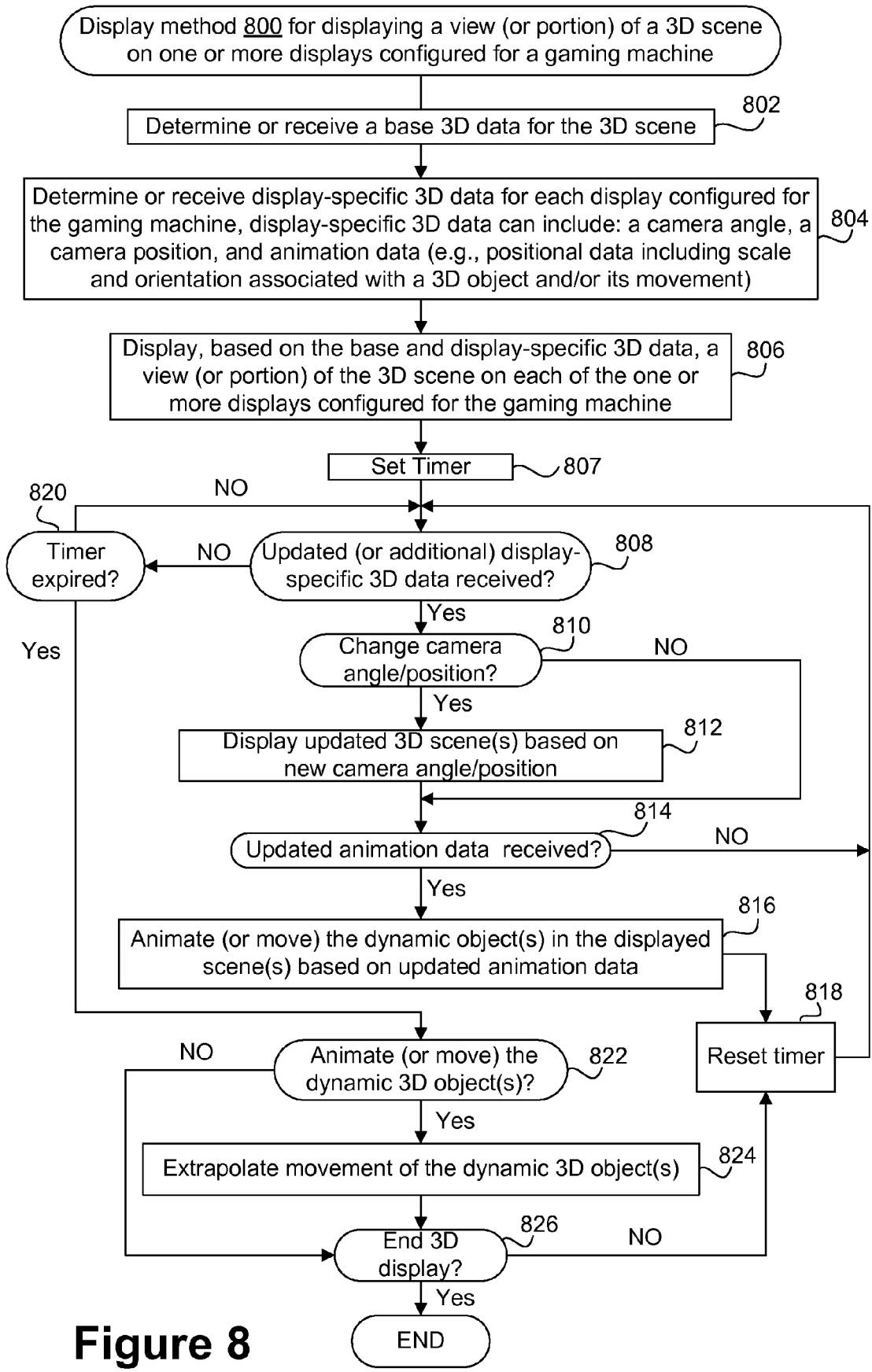
FIG. 8 depicts a display method for displaying a view (or portion) of a 3D scene on one or more displays configured for a gaming machine in accordance with one embodiment of the invention.

FIG. 8 depicts a display method 800 for displaying a view (or portion) of a 3D scene on one or more displays configured for a gaming machine in accordance with one embodiment of the invention. Display method 800 can, for example, be used by a gaming machine to effectively display a view (or portion) of a main (or larger) 3D scene. The main (or larger) 3D scene is effectively displayed across multiple displays. The gaming machine can be configured in a configuration (or bank) or gaming machines where each of the gaming machines displays its respective view (or portion) of the main (or larger) 3D scene. Initially, 3D base data for the 3D scene is determined or received (802). Again, base 3D data can, for example, provide general data relating to the main (or larger) 3D scene. Next, display-specific 3D data is determined or received (804) for each display configured for the gaming machine. As noted above, the display-specific 3D data can, for example, be any additional or complementary data needed to display a specific view, part and/or portion of a 3D scene on a particular display. Thus, the combination of the base 3D data and any display-specific 3D data can be used to display (or render) a particular view, part and/or portion of a 3D scene. By way of example, display-specific 3D data can include a camera angle, camera position, and animation data. A camera angle and position can be used to display a particular view (or portion) of a main 3D scene. Animation data can effectively indicate how to move one or more 3D dynamic objects in the 3D scene. By way of example, animation data can be provided as positional data including scaling and orientation data associated with one or more 3D objects and/or their movement. Those skilled in the art will appreciate that positional data can, for example, be provided in a vector form (e.g., 3×3, 4×4 matrices).

In any case, the gaming machine can use the combination of base and display-specific 3D data to display (806) at least a portion (or view) of the 3D scene. Thereafter, it is determined (808) whether an updated (or additional) display-specific 3D data has been received (808). The updated (or additional) display-specific 3D data can include a new (or different) camera angle and/or position for displaying the 3D scene. Accordingly, it is determined (810) whether to change the camera angle and/or position, and the view (or portion) of the 3D scene can be updated (812) accordingly. In other words, a different view or portion of the 3D scene can be displayed (812) using a new (or different) camera angle and/or or position. The updated (or additional) display-specific 3D data can also include animation data for animation (or movement) of 3D objects depicted in a view or portion of the 3D scene displayed by one or more displays configured for the gaming machine. As such, it is determined (814) whether updated (or additional) animation data has been received so that the one or more 3D dynamic objects can be animated (or moved) accordingly. As noted above, the animation data can, for example, include positional data provided as matrices that effectively describe how to animate (or move) a 3D object in a 3D scene. The animation data can, for example, be determined and send periodically to the gaming machine by a central entity (e.g., a host/server). As such, the central entity can effectively determine and periodically send updated animation data to multiple gaming machines in order to synchronize animation or graphics effectively across multiple displays configured for the gaming machines. Hence, following the animation (816) of the one or more dynamic 3D objects, it is determined (808) whether updated view-specific 3D data has been received. However, it should be noted that a timer can also be reset (818). This timer is set (807) and can be effectively used to determine (808) whether updated view-specific 3D data has been received in time. More particularly, if it is determined (808) that display-specific data has not been received, it is determined (820) whether the timer has expired. If it is determined (820) that the timer has expired (i.e., updated display-specific 3D data has not been received before the timer expires), the display method 800 proceeds to determine (822) whether there is a need to animate one or more dynamic objects. Accordingly, one or more dynamic 3D objects can be animated (or moved) based on the extrapolation (824) of most current animation data. In effect, animation of a dynamic 3D object can be based on updated data periodically received (808) and/or extrapolation (824). The extrapolation (824) can continue until updated animation data is received or it is determined (826) or it is determined (826) to end display of the 3D scene. The 3D display process can, for example, end as a result of a gaming condition, event, or input (e.g., ending bonus game play, losing a game). The display method 800 ends if it is determined (826) to end the display.

As noted above, 3D base data and 3D display-specific data can be determined and provided for one or more displays configured for a gaming machine. It will be appreciated that the 3D display-specific data can be determined based on one or more criteria, conditions and/or properties associated with a gaming machine. In other words, 3D base data can be changed and/or adjusted for a particular gaming machine in accordance with one or more criteria, conditions and/or properties of the gaming machine. By way of example, 3D base scenes and/or objects of a 3D model (or world) which can be effectively provided for and displayed across multiple displays respectively configured for multiple gaming machines, can be adjusted and/or changed for individual gaming machines based on a gaming criterion, event and condition associated with each one of the gaming machines.

By way of example, the properties (e.g., shape, size, color) of a base 3D object (e.g., a blue fish) can vary as it is depicted for different gaming machines (e.g., a fish can change its colors as it is "swimming" in a virtual ocean depicted across displays configured for a bank or configurations of gaming machines). The properties of a gaming machine specific 3D object can depend and/or be adjusted, for example, based on various gaming criteria, conditions, and/or events. By way of example, a 3D object (e.g., fish) can effectively be presented in a particular color (e.g., gold) on display of a gaming machine when a particular gaming criterion, event or condition has been met on the gaming machine (e.g., when maximum bet is made, a gold card member plays on the gaming machine).

It will also be appreciated that gaming machine specific 3D object displayed for a particular gaming machine can effectively indicate a gaming situation and/or convey gaming information pertaining to one or more games that can be played on the gaming machine. When a winning and/or bonus condition or event occurs for a gaming machine, a 3D gaming machine specific object can be use to display gaming information on the display of the gaming machine, for example, indicate the amount of a prize or bonus won. By way of example, a base object (e.g., a fish) can be effectively changed to a specific 3D object that indicates gaming information (e.g., a fish with a $ amount won). However, the same 3D object would be displayed without the gaming information for a gaming machine that does not meet the winning and/or bonus conditions (e.g., fish would not be displayed with a prize or bonus amount as it was for the gaming machine with a win or bonusing situation).

The gaming criteria, event or condition can, for example, represent one or more of the following: a bouncing event, a win condition, amount of a current bet, amount bet in a period of time, total amount bet for a number of game instances, type of game played, individual person or player playing.

Figure 9:
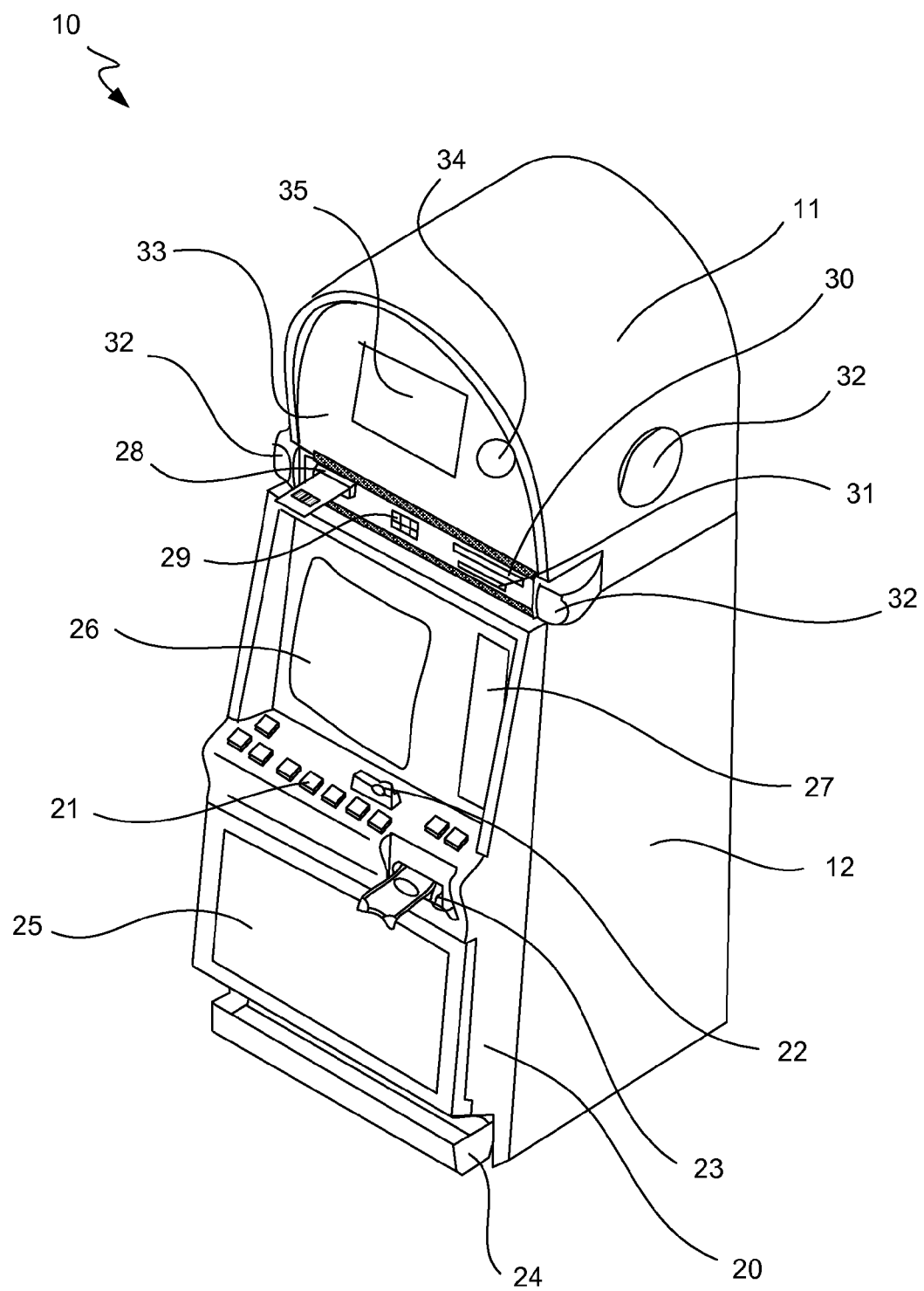
FIG. 9 illustrates in perspective view an exemplary gaming machine.

Referring to FIG. 9, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions. One item that is specifically contemplated for use with the present invention involves a gaming machine that incorporates a reusable cashless instrument feature, such as a reusable cashless instrument issuing device and/or a reusable cashless instrument reading device.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset time-frame, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage-monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

Figure 10:
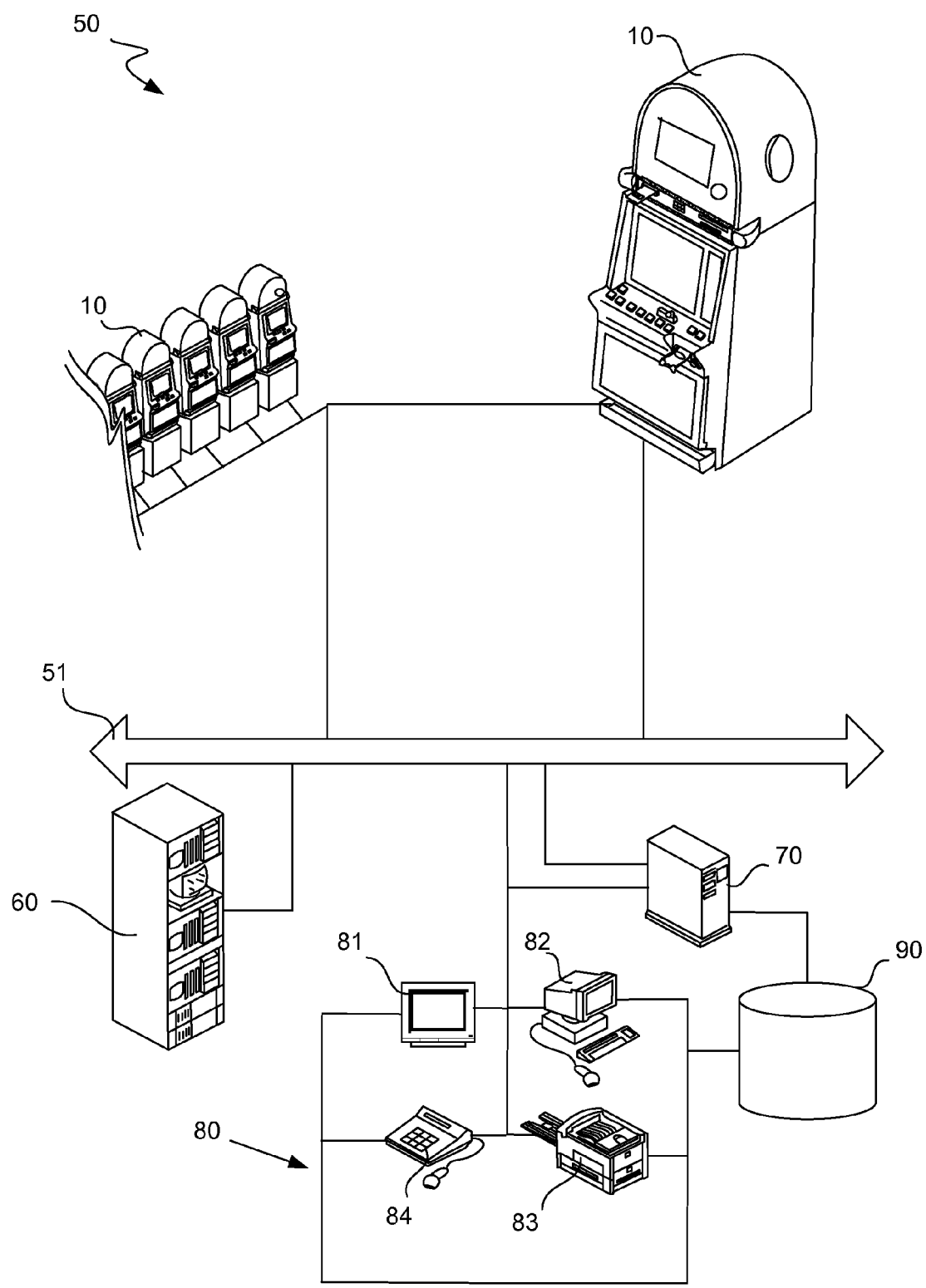
FIG. 10 illustrates in block diagram format an exemplary network.

Turning now to FIG. 10, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 70, a sub-network of peripheral devices 80, and/or a database 90.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 70 or another similar component within a general-purpose server 60 also preferably includes a connection to a database or other suitable storage medium 90. Database 90 is preferably adapted to store many or all files containing pertinent data or information regarding cashless instruments such as tickets, among other potential items. Files, data and other information on database 90 can be stored for backup purposes, and are preferably accessible at one or more system locations, such as at a general-purpose server 60, a special purpose server 70 and/or a cashier station or other sub-network location 80, as desired.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or program modules are added. In addition to new hardware, new functionality via new software, modules, updates or otherwise can be provided to an existing database 90, specialized server 70 and/or general-purpose server 60, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

What is claimed is:

1. A casino gaming system comprising:
    a first gaming display, the first gaming display configured to display a base animated three-dimensional (3D) content model from a first perspective; and
    a second gaming display, the second gaming display configured to display the same base animated 3D content model from a second perspective different from the first perspective, wherein the first perspective and the second perspective are selected based on the physical orientation of the first gaming display with respect to the second gaming display, and the base animated 3D content model indicates a gaming event or condition.

2. The casino gaming system of claim 1, wherein the first gaming display and the second gaming display are included in different gaming machines.

3. The casino gaming system of claim 1, wherein the first gaming display and the second gaming display are both included in a single gaming machine.

4. The casino gaming system of claim 1 further comprising a 3D content server, wherein the 3D content server is configured to provide base 3D data to the first gaming display and provide the base 3D data to the second gaming display, wherein the base 3D data defines the base animated 3D content model.

5. The casino gaming system of claim 4, wherein the 3D content server is further configured to determine the outcome of a game offered for play on the first gaming machine, the second gaming machine, or both the first gaming machine and the second gaming machine.

6. The casino gaming system of claim 1, wherein a different portion of the base animated 3D content model is displayed on the first gaming display than is displayed on the second gaming display.

7. The casino gaming system of claim 1,
    wherein the first gaming display is further configured to augment the base animated 3D content model with first gaming display-specific 3D data, the first 3D gaming display-specific data including data which is combined with the base animated 3D content model to produce the first perspective on the first gaming display, and
    wherein the second gaming display is further configured to augment the base animated 3D content model with second gaming display-specific 3D data, the second 3D gaming display-specific data including data which is combined with the base animated 3D content model to produce the second perspective on the second gaming display.

8. The casino gaming system of claim 7,
wherein the first gaming display-specific 3D data and the second gaming display-specific 3D data are different.
9. The casino gaming system of claim 7,
wherein at least one of the first gaming display-specific 3D data and the second gaming display-specific 3D data comprises data which modifies a parameter of the base animated 3D content model.
10. The casino gaming system of claim 7,
wherein at least one of the first gaming display-specific 3D data and the second gaming display-specific 3D data comprises data defining a perspective.
11. The casino gaming system of claim 7,
wherein at least one of the first gaming display-specific 3D data and the second gaming display-specific 3D data comprises data defining an animation of one or more 3D objects in the base animated 3D content model.
12. The casino gaming system of claim 7,
wherein at least one of the first gaming display-specific 3D data and the second gaming display-specific 3D data comprises data modifying a property of one or more 3D objects in the base animated 3D content model.
13. The casino gaming system of claim 12,
wherein the property is selected from the group consisting of shape, size, position, orientation, or color of the 3D object.
14. The casino gaming system of claim 7,
wherein at least one of the first gaming display-specific 3D data and the second gaming display-specific 3D data comprises data replacing one or more 3D objects in the base animated 3D content model with one or more different 3D objects.
15. The casino gaming system of claim 1,
wherein the first gaming display and the second gaming display are substantially parallel to one another and wherein the second gaming display is oriented in an opposite direction from the first gaming display with respect to an observer of the first gaming display.
16. A casino gaming server comprising:
one or more processors; and
a communications interface, the communications interface configured to provide communications with one or more gaming machines over a network connection,
wherein the one or more processors are configured to:
provide base three-dimensional (3D) data to the one or more gaming machines via the network connection, the base 3D data defining a base animated 3D content model;
provide first gaming display-specific 3D data to the one or more gaming machines via the network connection, the first gaming display-specific 3D data including information used to generate a first perspective view of the base animated 3D content model on a first gaming display; and
provide second gaming display-specific 3D data to the one or more gaming machines via the network connection, the second gaming display-specific 3D data including information used to generate a second perspective view of the same base animated 3D content model on a second gaming display,
wherein the first perspective and the second perspective are different,
the first perspective and the second perspective are selected based on the physical orientation of the first gaming display with respect to the second gaming display, and the base animated 3D content model indicates a gaming event or condition.

17. The casino gaming server of claim 16, wherein the first gaming display and the second gaming display are both included in a single gaming machine of the one or more gaming machines.
18. The casino gaming server of claim 16, wherein the first gaming display is included in a first gaming machine of the one or more gaming machines and wherein the second gaming display is included in a second gaming machine of the one or more gaming machines.
19. The casino gaming server of claim 16, wherein the first perspective view is of a first portion of the base animated 3D content model, wherein the second perspective view is of a second portion of the base animated 3D content model, and wherein the first portion and the second portion are different.
20. The casino gaming server of claim 16, the one or more processors further configured to determine the outcome of a game offered for play on the one or more gaming machines.
21. The casino gaming server of claim 16, wherein at least one of the first gaming display-specific 3D data and the second gaming display-specific 3D data comprises data which modifies a parameter of the base animated 3D content model.
22. The casino gaming server of claim 16, wherein at least one of the first gaming display-specific 3D data and the second gaming display-specific 3D data comprises data defining a perspective.
23. The casino gaming server of claim 16, wherein at least one of the first gaming display-specific 3D data and the second gaming display-specific 3D data comprises data defining an animation of one or more 3D objects in the base animated 3D content model.
24. The casino gaming server of claim 16, wherein at least one of the first gaming display-specific 3D data and the second gaming display-specific 3D data comprises data modifying a property of one or more 3D objects in the base animated 3D content model.
25. The casino gaming server of claim 24, wherein the property is selected from the group consisting of shape, size, position, orientation, or color of the 3D object.
26. The casino gaming server of claim 16, wherein at least one of the first gaming display-specific 3D data and the second gaming display-specific 3D data comprises data replacing one or more 3D objects in the base animated 3D content model with one or more different 3D objects.
27. The casino gaming system of claim 16, wherein the first gaming display and the second gaming display are substantially parallel to one another and wherein the second gaming display is oriented in an opposite direction from the first gaming display with respect to an observer of the first gaming display.
28. A method comprising:
displaying a first perspective view of a base animated 3D content model on a first gaming display; and
displaying a second perspective view of the same base animated 3D content model on a second gaming display,
wherein the first perspective view and the second perspective view are different, the first perspective view and the second perspective view are selected, using a computer, based on the physical orientation of the first gaming display with respect to the second gaming display, and the base animated 3D content model indicates a gaming event or condition.
29. The method of claim 28, wherein the first gaming display and the second gaming display are both included in a single gaming machine.

30. The method of claim 28, wherein the first gaming display is included in a first gaming machine and wherein the second gaming display is included in a second gaming machine.

31. The method of claim 28, wherein the first perspective view is of a first portion of the base animated 3D content model, wherein the second perspective view is of a second portion of the base animated 3D content model, and wherein the first portion and the second portion are different.

32. The method of claim 28, the method further comprising:
augmenting base 3D data with first gaming display-specific 3D data, wherein the base 3D data defines the base animated 3D content model, and wherein the first gaming display-specific 3D data includes information used to generate the first perspective view of the base animated 3D content model on the first gaming display; and
augmenting the base 3D data with second gaming display-specific 3D data, wherein the second gaming display-specific 3D data includes information used to generate the second perspective view of the base animated 3D content model on the second gaming display.

33. The method of claim 32, wherein at least one of the first gaming display-specific 3D data and the second gaming display-specific 3D data comprises data which modifies a parameter of the base animated 3D content model.

34. The method of claim 32, wherein at least one of the first gaming display-specific 3D data and the second gaming display-specific 3D data comprises data defining a perspective.

35. The method of claim 32, wherein at least one of the first gaming display-specific 3D data and the second gaming display-specific 3D data comprises data defining an animation of one or more 3D objects in the base animated 3D content model.

36. The method of claim 32, wherein at least one of the first gaming display-specific 3D data and the second gaming display-specific 3D data comprises data modifying a property of one or more 3D objects in the base animated 3D content model.

37. The method of claim 36, wherein the property is selected from the group consisting of shape, size, position, orientation, or color of the 3D object.

38. The method of claim 32, wherein at least one of the first gaming display-specific 3D data and the second gaming display-specific 3D data comprises data replacing one or more 3D objects in the base animated 3D content model with one or more different 3D objects.

39. The method of claim 32, wherein the first gaming display and the second gaming display are substantially parallel to one another and wherein the second gaming display is oriented in an opposite direction from the first gaming display with respect to an observer of the first gaming display.

* * * * *

UNITED STATES PATENT AND TRADEMARK OFFICE
CERTIFICATE OF CORRECTION

Page 1 of 1

PATENT NO. : 8,384,710 B2
APPLICATION NO. : 11/759825
DATED : February 26, 2013
INVENTOR(S) : Schlottmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1381 days.

Signed and Sealed this
Twenty-third Day of December, 2014

Michelle K. Lee
*Deputy Director of the United States Patent and Trademark Office*